Figure 3:
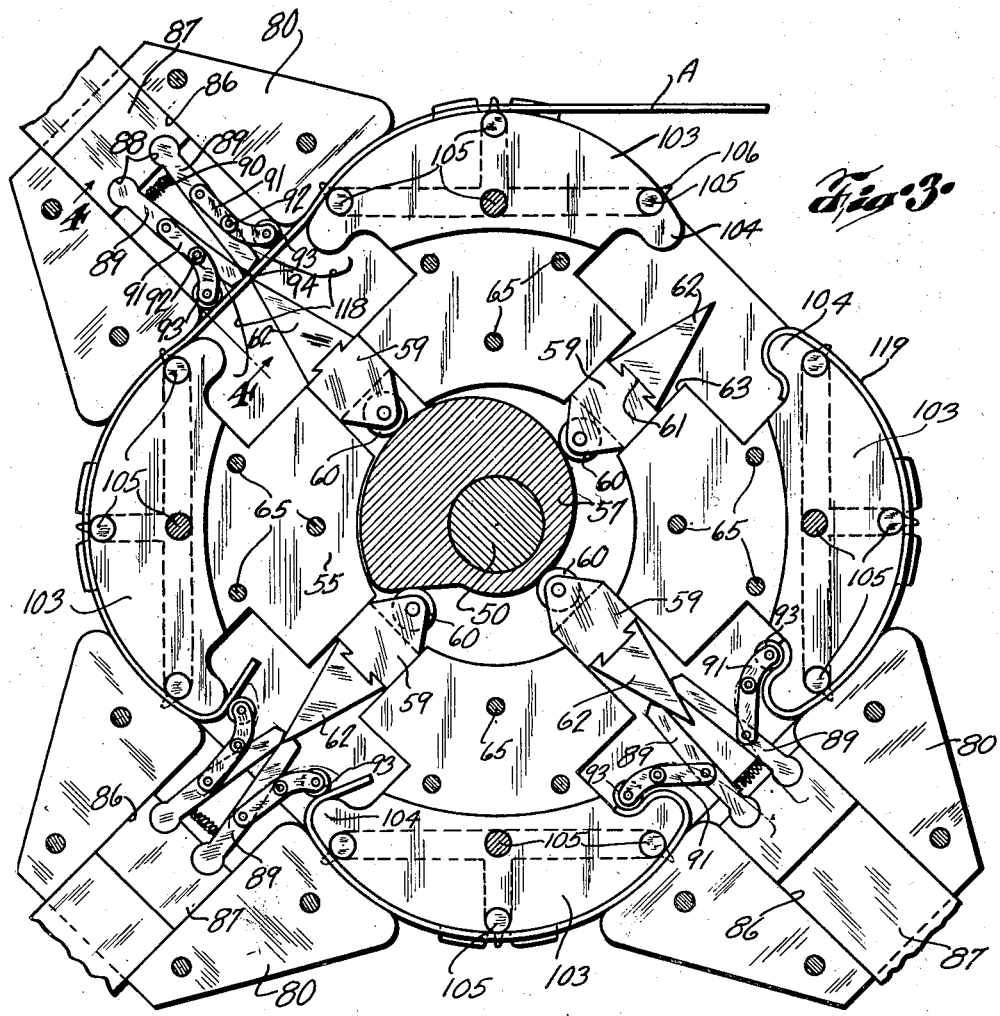

April 9, 1935.                R. E. BEEGLE                1,997,098
                    METAL CUTTING AND FORMING APPARATUS
                    Filed Feb. 6, 1933      11 Sheets-Sheet 1

Fig. 1.

Fig. 11.

INVENTOR.

Raymond E. Beegle

April 9, 1935.  R. E. BEEGLE  1,997,098
METAL CUTTING AND FORMING APPARATUS
Filed Feb. 6, 1933  11 Sheets-Sheet 2
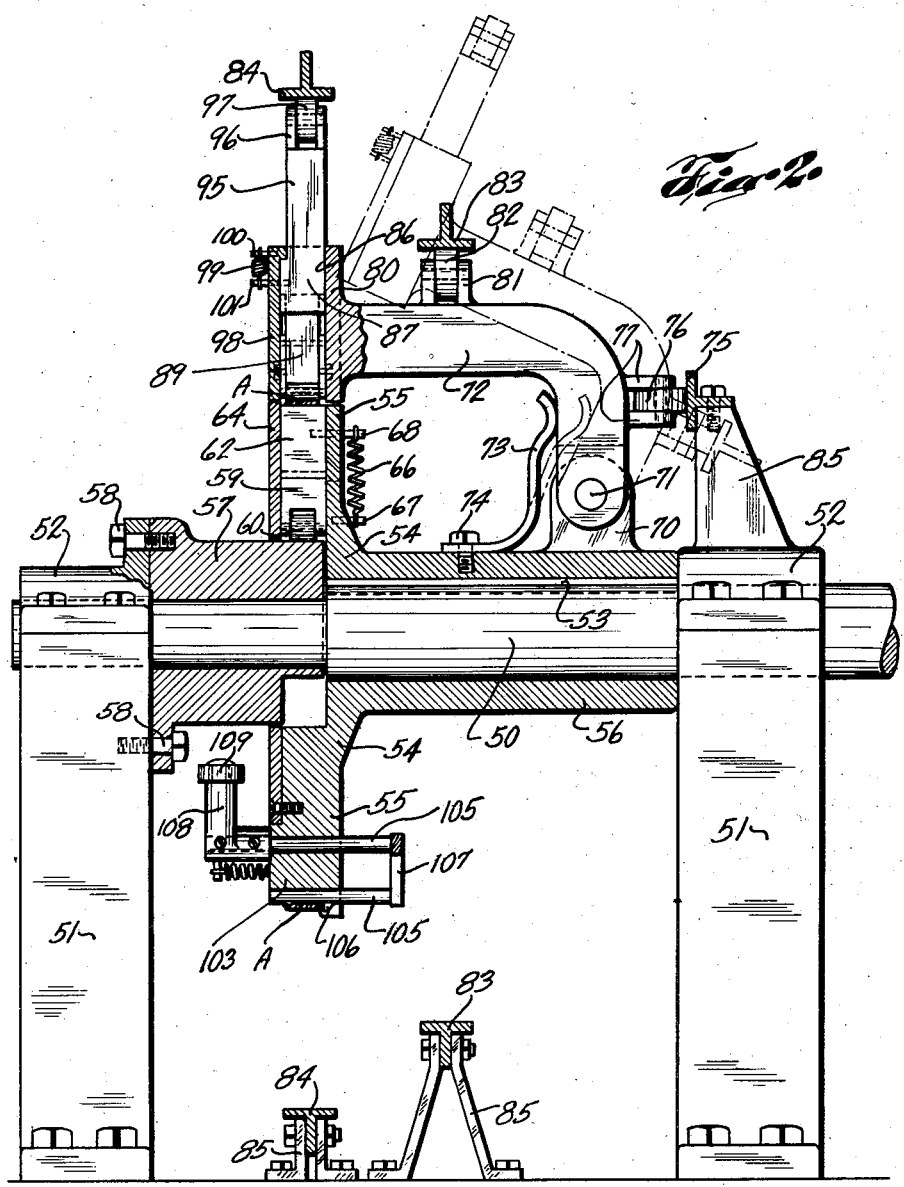
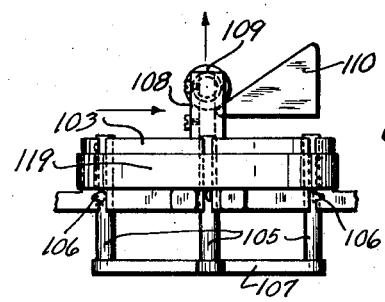
INVENTOR.
Raymond E. Beegle April 9, 1935.  R. E. BEEGLE  1,997,098
METAL CUTTING AND FORMING APPARATUS
Filed Feb. 6, 1933   11 Sheets-Sheet 3

INVENTOR.
Raymond E. Beegle

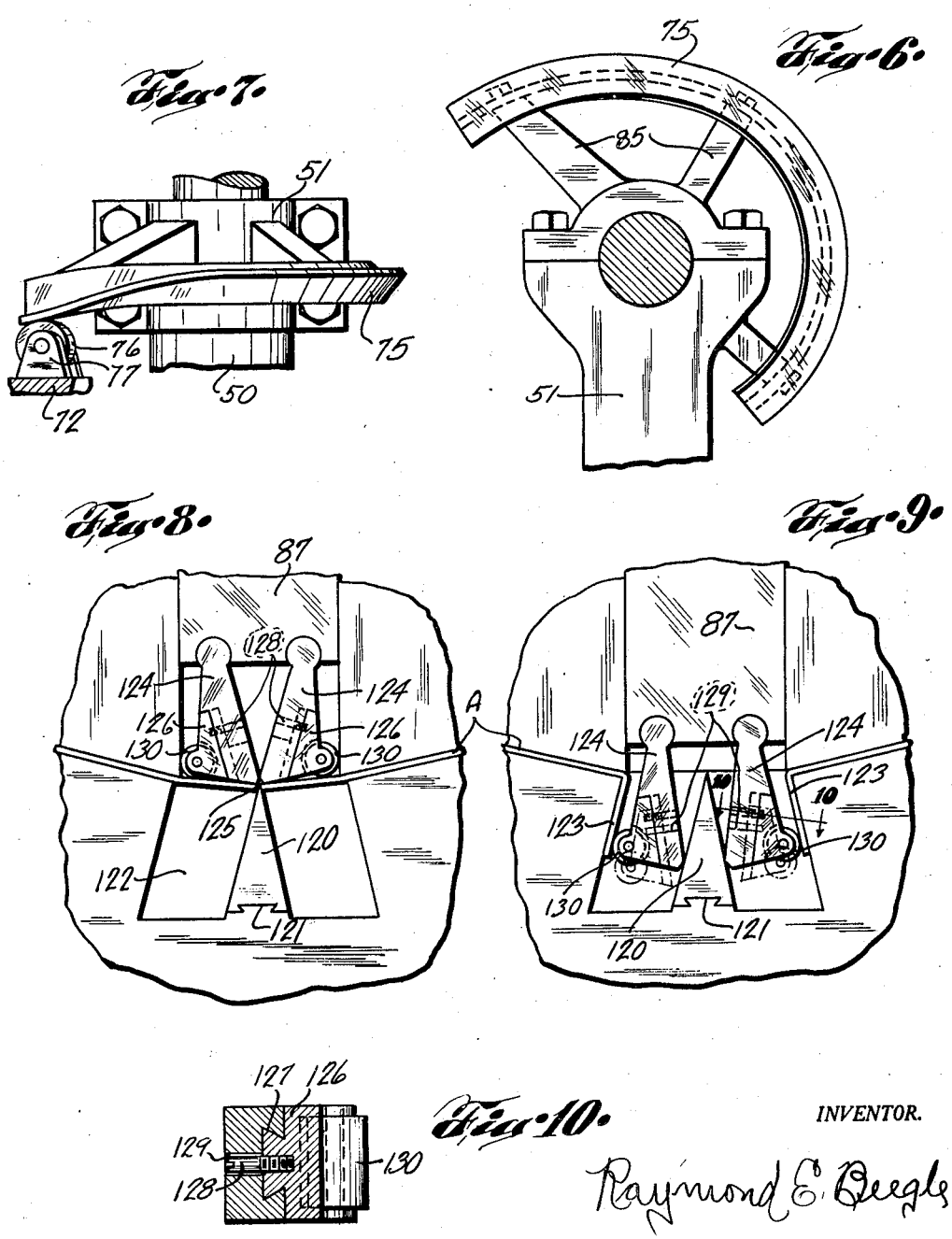

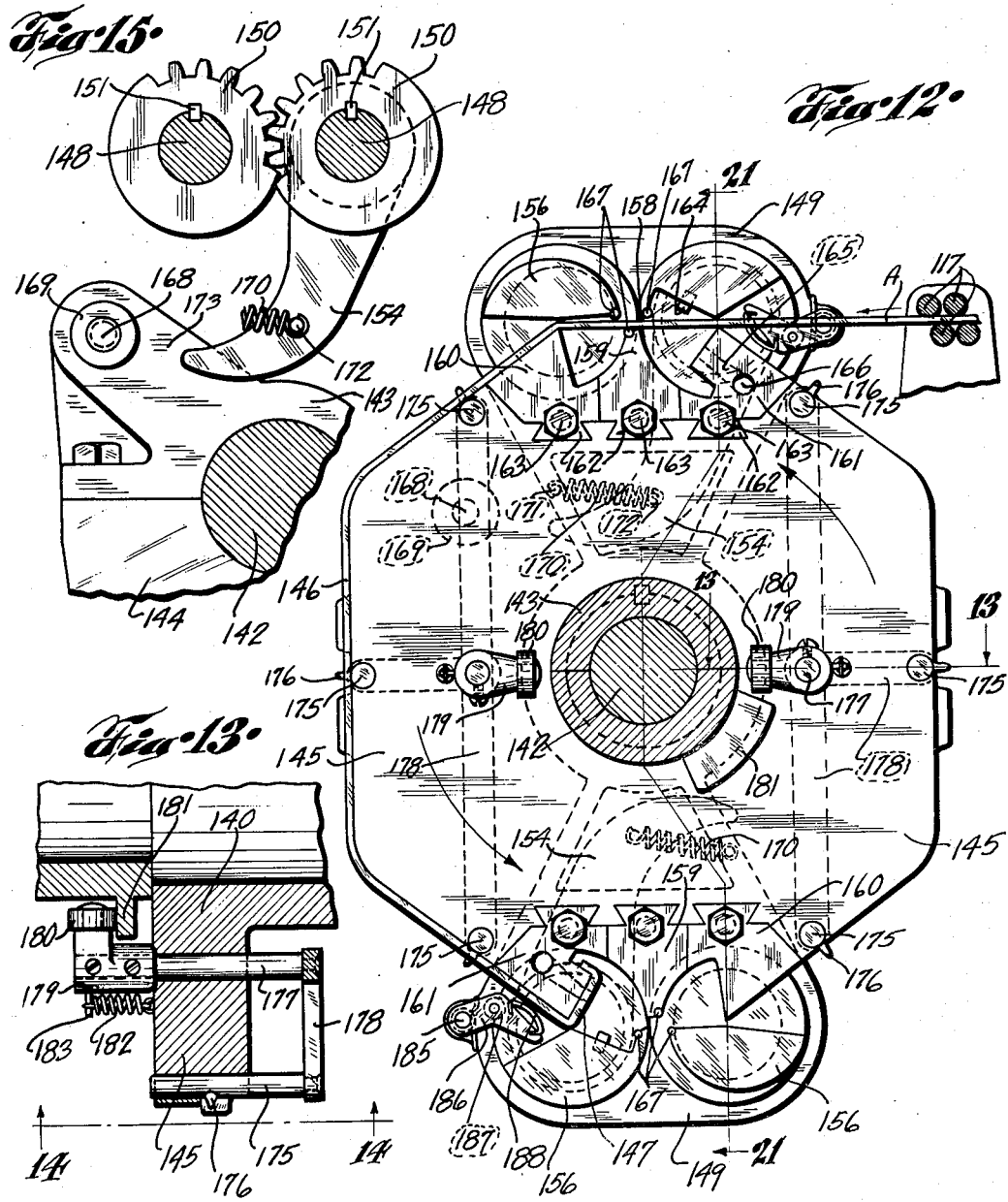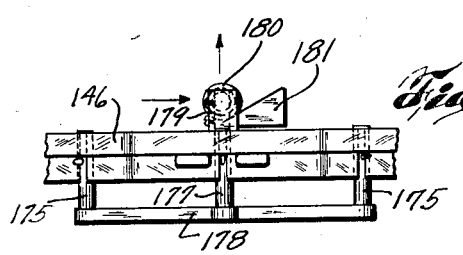

April 9, 1935. R. E. BEEGLE 1,997,098
METAL CUTTING AND FORMING APPARATUS
Filed Feb. 6, 1933 11 Sheets-Sheet 6
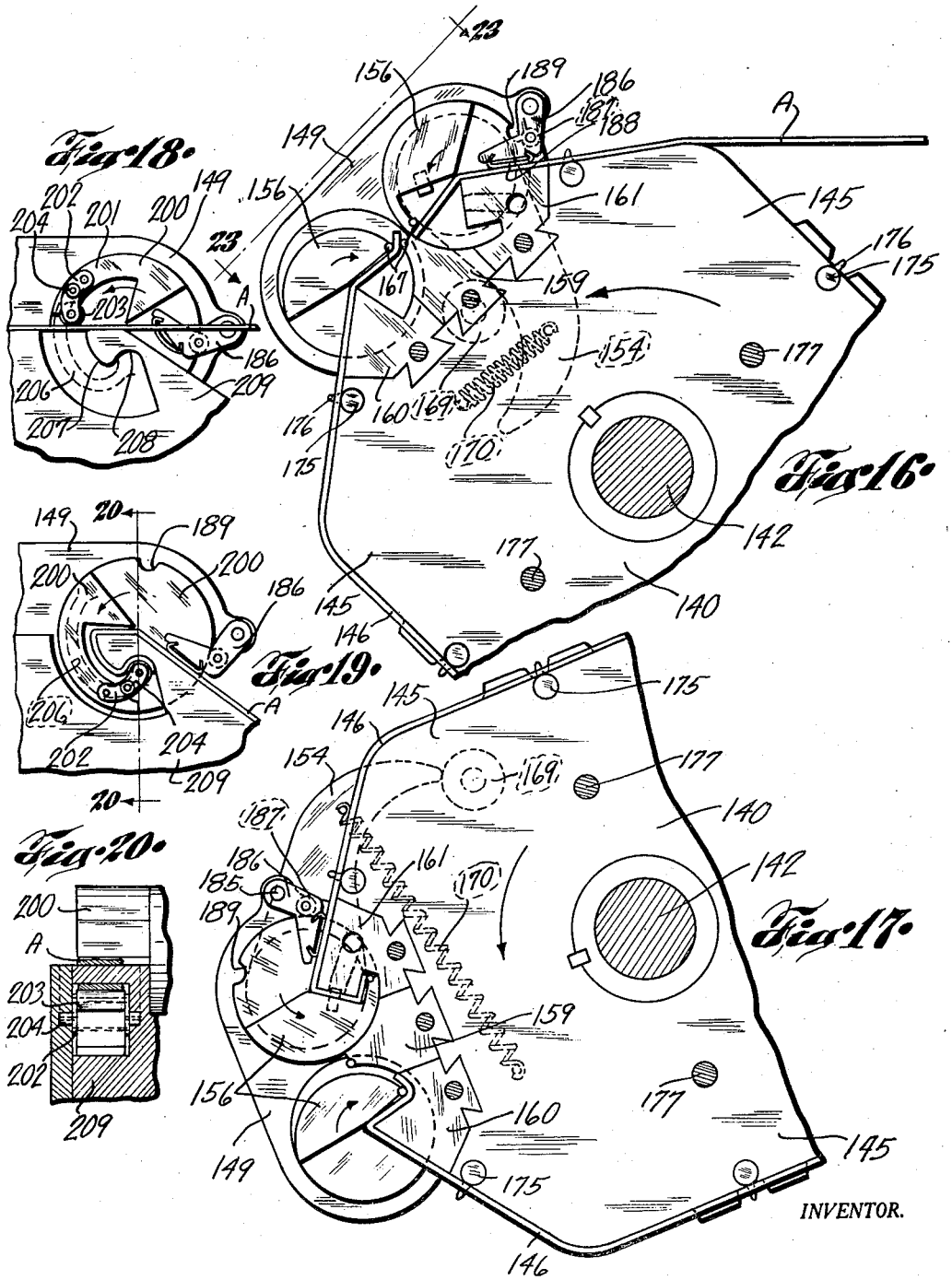
INVENTOR.
Raymond E. Beegle

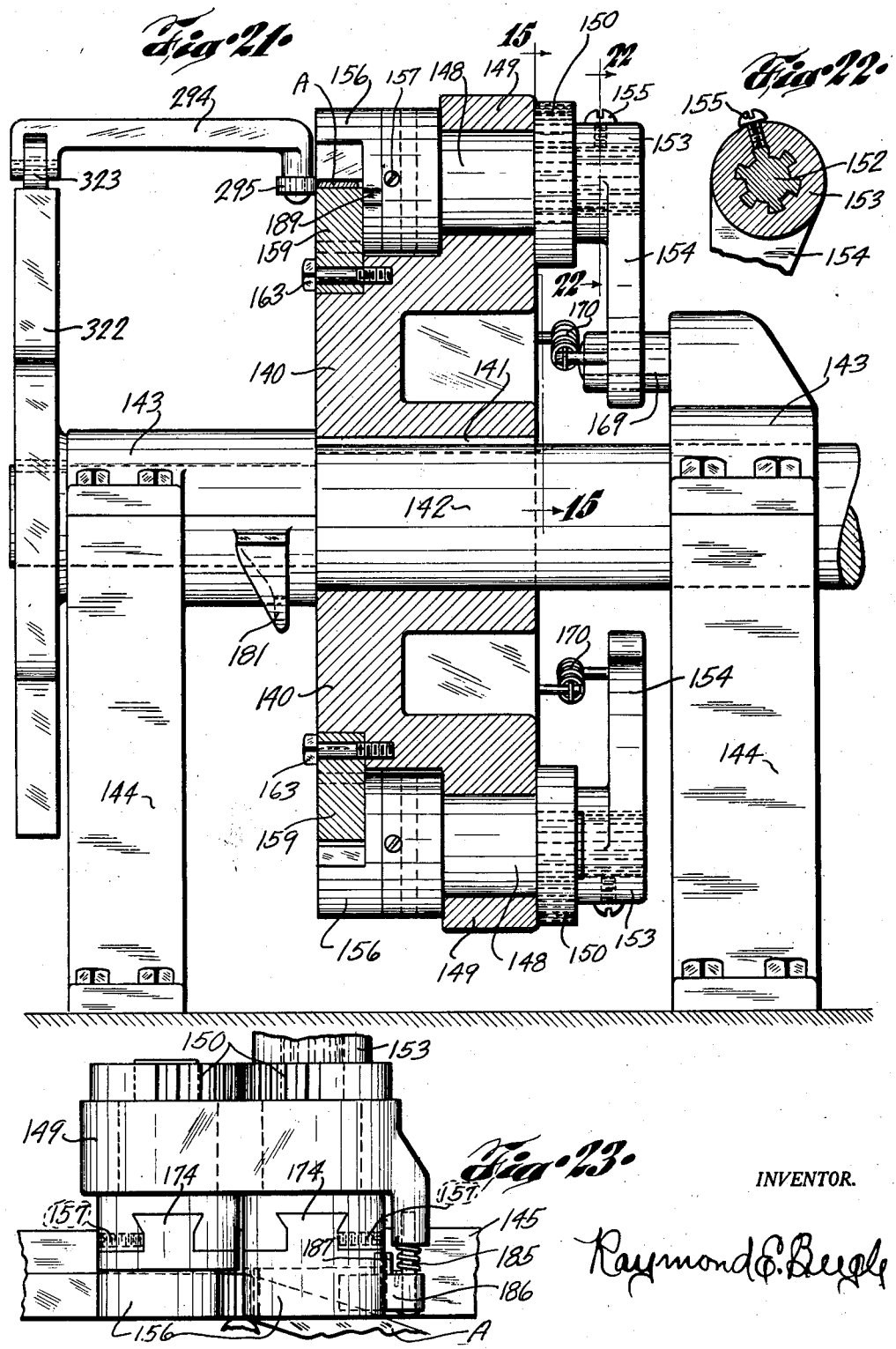

April 9, 1935. R. E. BEEGLE 1,997,098
METAL CUTTING AND FORMING APPARATUS
Filed Feb. 6, 1933 11 Sheets-Sheet 8
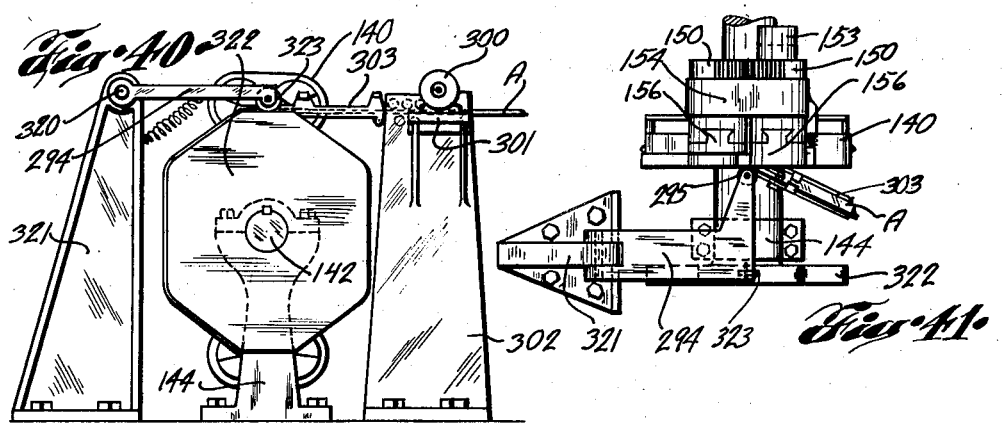
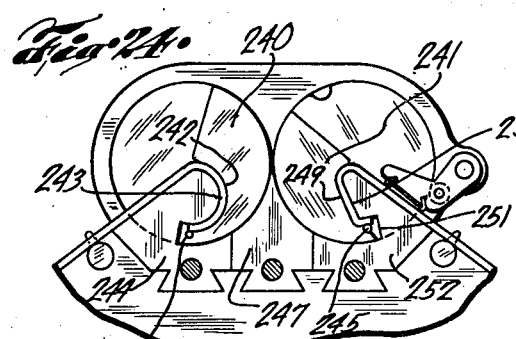
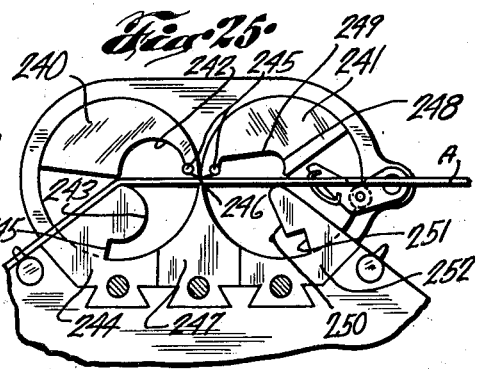
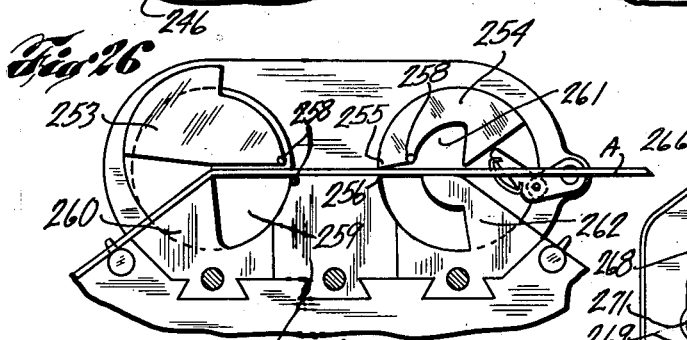
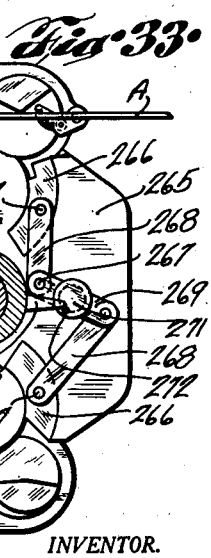
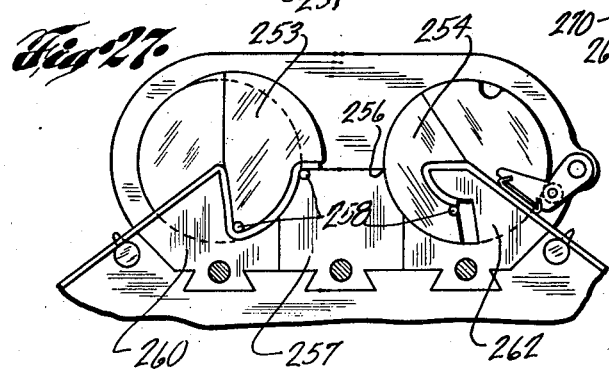
INVENTOR.
Raymond E. Beegle

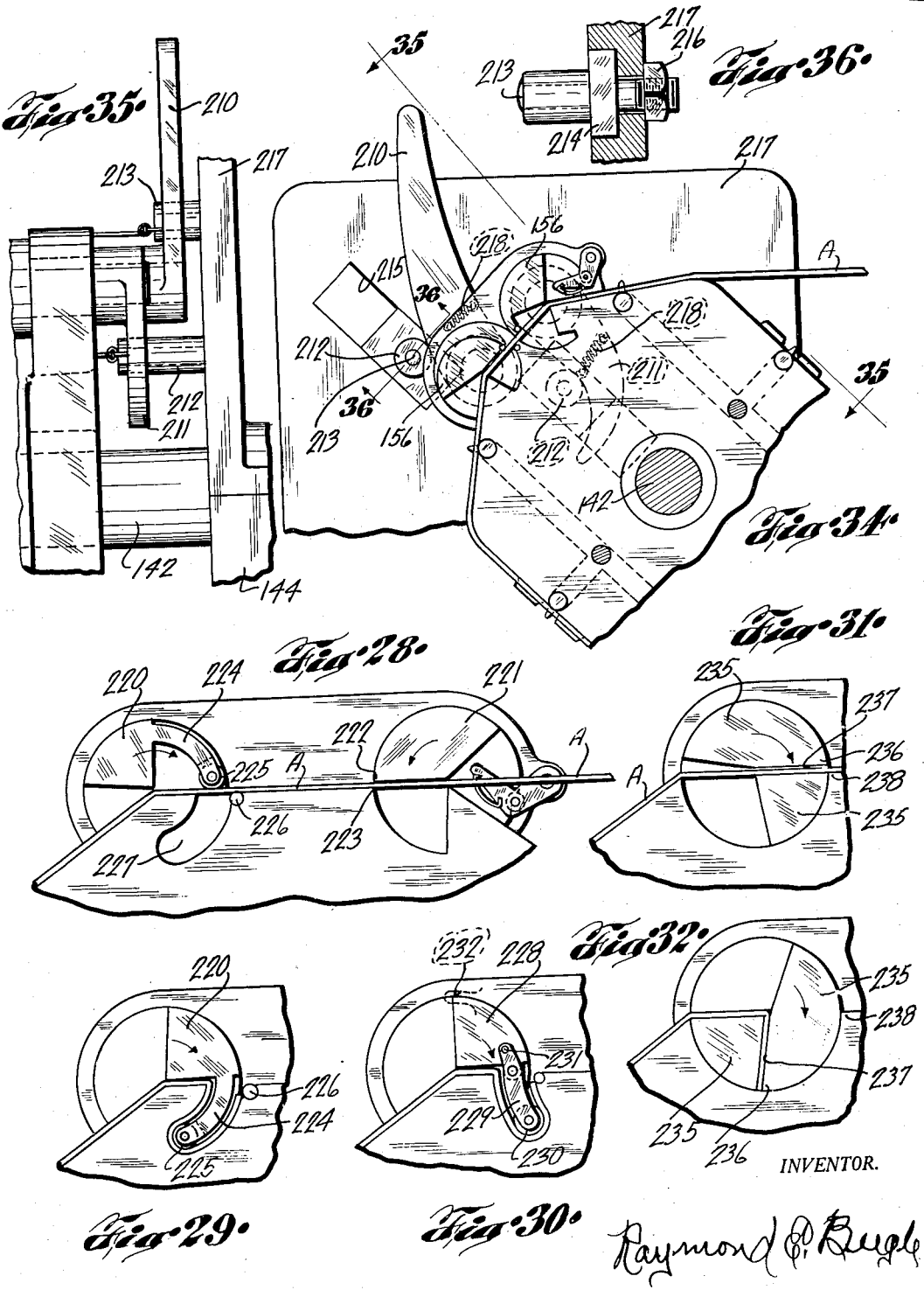

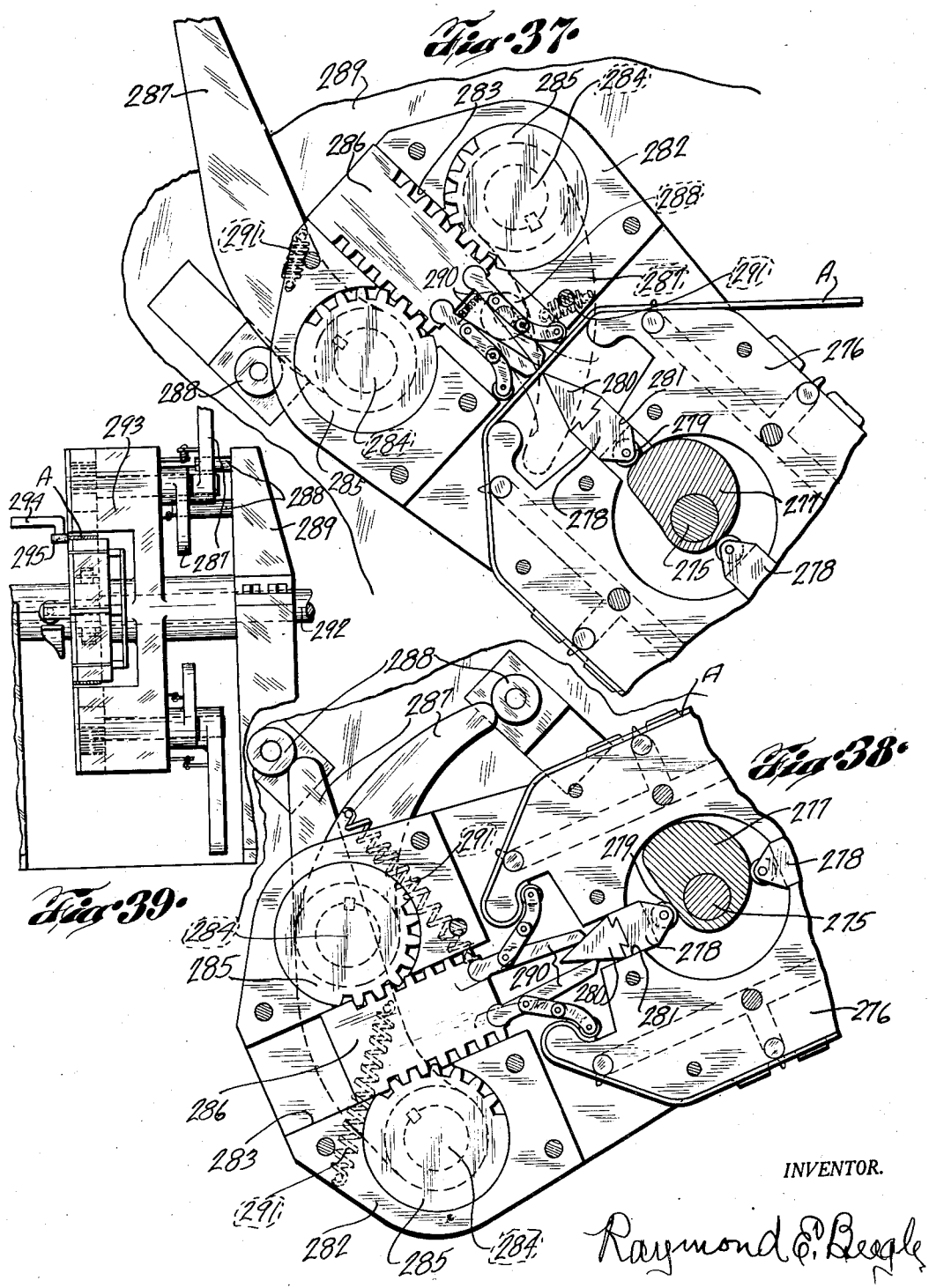

April 9, 1935.  R. E. BEEGLE  1,997,098
METAL CUTTING AND FORMING APPARATUS
Filed Feb. 6, 1933   11 Sheets-Sheet 11
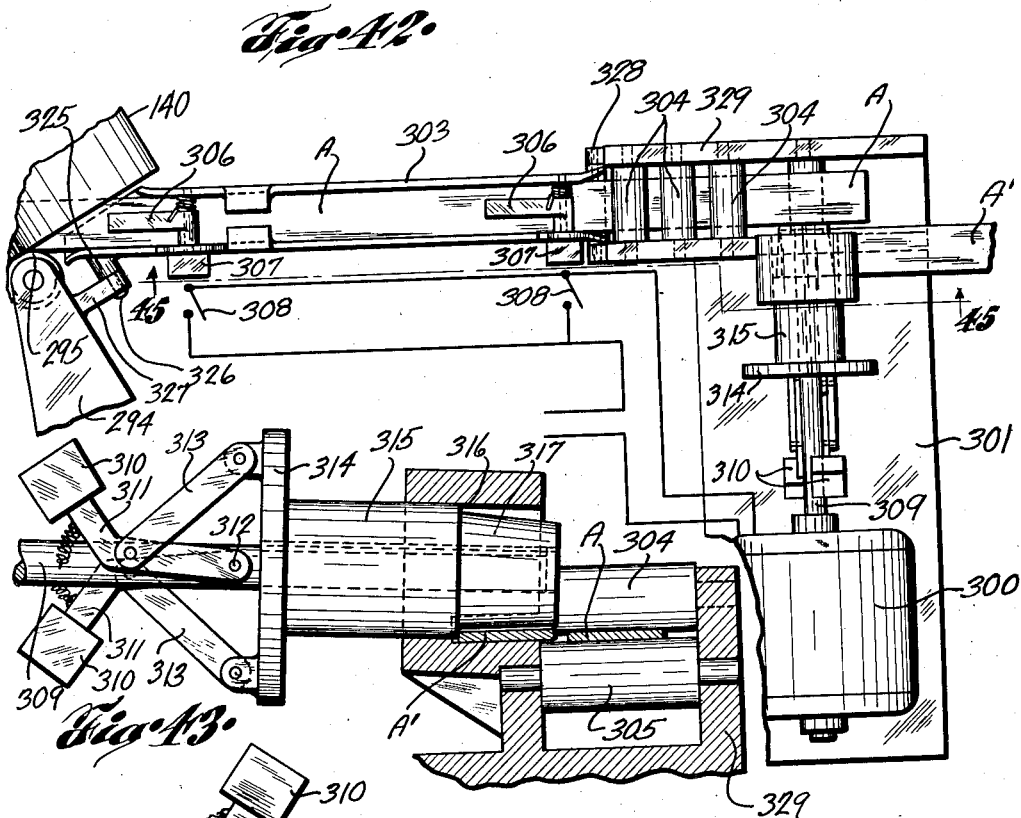
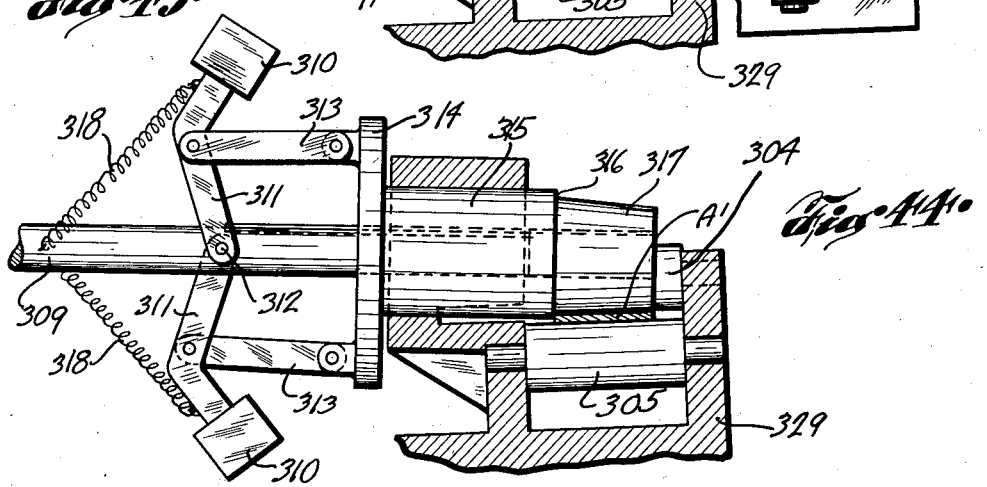
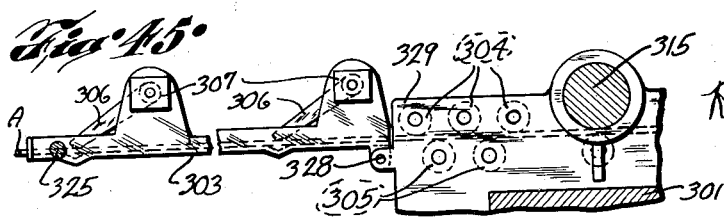
INVENTOR.
Raymond E. Beegle Patented Apr. 9, 1935

1,997,098

UNITED STATES PATENT OFFICE 1,997,098

METAL CUTTING AND FORMING APPARATUS

Raymond E. Beegle, East St. Louis, Ill.

Application February 6, 1933, Serial No. 655,465

39 Claims. (Cl. 153—2)

This invention relates to improvements in metal cutting and forming apparatus, and more particularly to an improved apparatus embodying a rotary die, for the cutting and shaping of metal objects.

An object of the invention, generally stated, may be expressed as an improved apparatus for the continuous production of metal articles, particularly those of types formed by shaping or bending elongate metal stock, such as steel strip.

Another object of the invention is attained in improved apparatus, through the use of which the operations of cutting and forming metal articles, particularly those formed of strip material, may be accomplished concurrently in a rotating apparatus.

A further object of the invention is attained in improved means for shaping strip metal generally, and embodying a rotary die organization, characterized by a continuous and uniform rotary movement of a forming member, accompanied by a cyclic reciprocation of cutting and forming elements responsively to the rotation of the forming member.

A still further object of the invention is attained in a rotary metal-forming apparatus, susceptible of absolutely continuous operation, due to its embodiment of an automatic arrangement for feeding the preformed metal, such as to insure continuity of supply of such metal, together with improved means associated with the forming organization, for the removal or ejection of the formed article, as fast as produced.

An additional object of the invention is attained in a rotary metal-forming device, in which all cutting and forming members are or may be readily detachable to permit replacement, and to facilitate substitution of die parts, whereby the device lends itself readily and interchangeably to the formation of materials, particularly strip metal, into any of a wide variety of shapes.

Yet another object of the invention is attained in improved means adjunctive to a metal cutting and shaping apparatus, such that the feeding of preformed material, and the removal of formed articles, are entirely continuous, and automatic.

Yet a further object consists in the attainment of metal forming apparatus, particularly adapted to the treatment of strip material, such that the operations of cutting, bending, punching, and shaping, may be severally or collectively accomplished, concurrently, in a single rotating apparatus, and in a single operation.

More particularly stated with reference to the present disclosure, an objective of this invention is attained in a rotary organization for the purposes noted, in which a rotary element serves as a reel or carrier for a length of strip material being formed, and in which the operation or operations of the complete formation, may be cyclically effected during a single revolution of the rotary element.

An additional object may be noted as attained in a rotary die mechanism, wherein a single rotating organization embodies all coacting cutting elements, as well as all coacting forming and shaping parts; thus the several parts are always kept in registrable relation, and perfectly timed, and serve to obviate many of the notorious difficulties of the older mechanism classified, generally, as indexing dies.

It will be understood that the foregoing objects are merely suggestive, and not intended as exhaustive of the potentialities of the invention, since a number of additional objects and advantages will present themselves in the course of the following description, considered in connection with the accompanying drawings of certain preferred embodiments of the invention.

Figure 4:
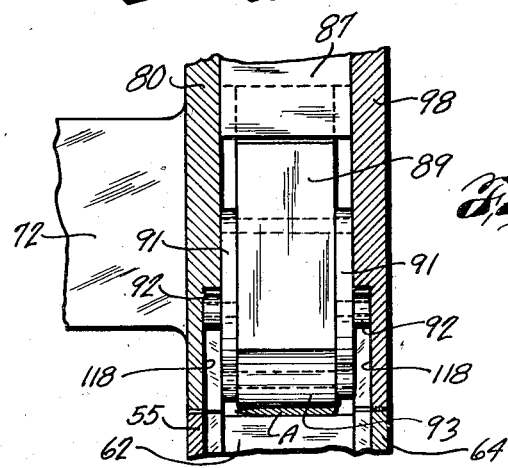

In the drawings:

Fig. 1 is a side elevation, partly in section of the metal-cutting and forming portions of a device constructed in accordance with the present invention; Fig. 2 is a vertical sectional elevation at a right angle to the showing of Fig. 1, and being taken along line 2—2 of Fig. 1; Fig. 3 is an enlarged elevation of portions of the structure of Fig 1, certain parts having been removed to indicate the interior construction of the rotary die organization; Fig. 4 is a fragmentary sectional elevation as viewed along line 4—4 of Fig. 3; Fig. 5 is an elevation of an ejector assembly as utilized with the structure of Fig. 2, and as viewed from line 5—5 of Fig. 1; Fig. 6 is a side elevation of a stationary cam, and Fig. 7 a plan view of the structure of Fig. 6, and being an arrangement for moving the presser or shaper shoes of the structure of Fig. 1, into engagement with the reel portion thereof; Figs. 8 and 9 indicate respectively, as side elevations, the preliminary and final position of modified cutter elements adapted to be employed in connection with the structure of Fig. 1; Fig. 10 is a sectional elevation as viewed along line 10—10 of Fig. 9; Fig. 11 is a side elevation, partly in section, illustrating a preferred arrangement of supply reel for the metal strip or like material when employed in connection with the apparatus of the present invention, the arrangement being shown in connection with the forming device such as illustrated by Fig. 12; Fig. 12 is a side elevation, partly in section, of a modified structure of forming reel; Fig. 13 is a fragmentary section along line 13—13 of Fig. 12; Fig. 14 is an elevation, as viewed from beneath the structure, of an ejector device such as preferably employed in connection with the structure of Fig. 12; Fig. 14 being considered as viewed along lines 14—14 of Fig. 13; Fig. 15 is a fragmentary sectional elevation, along line 15—15 of Fig. 21, and illustrative of the manner of operation of certain of the rotary cutting and forming elements of the structure of Figs. 12 and 21; Figs. 16 and 17 are fragmentary side elevations, each partly in section, and illustrating, respectively, the preliminary and final positions of the rotary cutting and forming elements, carried by the rotary forming reel structure of Fig. 12; Figs. 18 and 19 are fragmentary side elevations illustrating, respectively, preliminary and final positions of a modified form of rotary cutting and forming structure, such as may be employed in connection with the assembly of Figs. 12, 16 and 17; Fig. 20 is a fragmentary sectional elevation as viewed along line 20—20 of Fig. 19; Fig. 21 is a vertical sectional elevation as viewed in an axial plane, of the assembly with which the arrangement of Fig. 12 is preferably employed, Fig. 21 being viewed along line 21—21 of Fig. 12; Fig. 22 is a sectional detail along line 22—22 of Fig. 21; Fig. 23 is a fragmentary plan view, may be considered as viewed along line 23—23 of Fig. 16, and illustrating particularly, the manner of securement of the rotary cutting and forming elements, to their actuating shaft, Figs. 24 and 25 are fragmentary side elevations of modified rotary cutting and forming elements which may be utilized, for example with the structure of Fig. 12. Figs. 24 and 25 illustrating, respectively, final and preliminary positions of two dissimilar types of the rotary element; Figs. 26 and 27 correspond to Figs. 25 and 24, illustrating a still further modified arrangement of the rotary cutting and forming element, and according to which the elements are spaced substantially farther apart than in Figs. 24 and 25, and further illustrating the facilities of the present structure for forming strip material from a variety of shapes; Figs. 28, 29, 30, 31 and 32 illustrate, in fragmentary elevation, cutting and forming elements still further modified in form and illustrating the adaptability of the shaping expedient for producing angulate, curved, or reentrant terminal portions of strip material, the left hand portion of Fig. 28 illustrating, with Fig. 29, the preliminary and final positions of a cutting and forming structure providing inwardly curved reentrant terminals, Fig. 30 showing a modification of Fig. 29, for outward reentrant terminals; and Figs. 31 and 32 showing preliminary and final positions of a further modification, Fig. 33 is a vertical sectional elevation illustrating a modified form of ejector, for automatically removing the formed objects from the reel member, such as, for example, of the general form shown by Fig. 12; Fig. 34 is a fragmentary side elevation, partly in section, showing an arrangement for modifying or adjusting, the sweep or throw of the rotary cutting and forming elements, for example such as those shown by Fig. 12; Fig. 35 is a fragmentary elevation as viewed along lines 35—35 of Fig. 34; Fig. 36 is a section, illustrating an adjustment feature, as viewed along line 36—36 of Fig. 34; Figs. 37 and 38 illustrate respectively, preliminary and final positions of a modified form of actuating mechanism for the rotary cutting and forming elements, the modifications of Figs. 37 and 38 being applicable either to the assembly of Fig. 12 or to the assembly of Fig. 1; Fig. 39 is a fragmentary end elevation of a cutting and forming assembly constructed according to the modifications of Figs. 37 and 38; Fig. 40 is a side elevation of an assembly embodying the principles of Fig. 12, and equipped with a continuous metal-feeding device; Fig. 41 is a fragmentary plan view of the structure of Fig. 40; Fig. 42 is a fragmentary plan view of the structure of Figs. 40 and 41, illustrating certain details of construction; Figs. 43 and 44 are fragmentary vertical sectional elevations of parts of the automatic continuous metal-feeding device, and Fig. 45 is a fragmentary side elevation of portions of the strip guiding structure of Fig. 42, Fig. 45 being considered as viewed along line 45—45 of Fig. 42.

Referring now by characters of reference to the drawings, and presently to the structure of Figs. 1 and 2, a shaft 50 is journalled in a plurality of bearing arms 51, provided with bearings 52 of any suitable type, there being secured to the shaft 50 as by a key 53, a body structure 54 of a forming reel. The body structure 54, in the structure illustrated, includes a disc-like portion 55 of generally polygonal outline, from one or the rear face of which extends an elongate sleeve like structure 56, provided with a keyway for the reception of key 53. Shown as surrounding a reduced portion of the shaft 50, is a stationary cam structure 57, secured against rotation as by cap screws 58, engaging suitable seats in a stationary portion, such as the adjacent bearing arm 51. The sectional shape or contour of the cam 57 best appears from Fig. 3.

It will be understood, of course, that shaft 50 is provided, outwardly of the bearing arm 51, with a suitable power connection such as a drive pulley, (not shown).

Mounted for reciprocating movement within the disc-like body 55 of the forming reel, are a plurality of slidably disposed heads 59 (Fig. 3) four such reciprocable members being shown in the illustrated example. The inner ends of the heads 59 are each provided with a roller 60, adapted, as hereinafter appears, to follow the surface of cam 57, and thus, as the forming reel rotates, the heads 59 are subjected to a reciprocating movement. The outer face of each of the reciprocating heads 59 is provided with a mortised connection 61, and with a cutting anvil 62, the connection 61 serving to permit ready detachment and replacement, of the anvil 62.

It will appear that the disc-like body 55 of the forming reel, is constructed to provide guideways 63, one for each of the reciprocable heads 59, the guideways being in the nature of recesses in the body element proper. Closure of such recesses and finish of the outer face of the reel member is provided for by a closure plate 64, positioned as by screws 65 (Fig. 1), the closure plates serving to constrain the members 59 to a radial movement as influenced by the contour of cam 57.

It will appear that the cam 57 serves, of itself, only to impel the heads 59 outwardly, and since it is necessary to insure the retraction of members 59 corresponding to the contour of the cam, there is provided for each of the heads 59, a spring 66 (Fig. 2), each spring 66 being a tension element, connected at its inner end to a fixed anchorage or pin 67, and at its outer ends to a pin 68 extending through a suitable slot therefor (not shown) into the associated head 59. It thus appears that, as the reel body 55 is rotated under the influence of shaft 50, the cam 57 remains stationary, the cutting heads or cross heads 59 will be subjected to a complete reciprocating movement or stroke, with each revolution of the forming reel.

As best appears from Fig. 2, the sleeve portion 56 of the reel structure, is provided with apertured extensions 70, each, or a pair thereof, serving to receive a pivot pin 71, engaging a bifurcated end of a swingable arm 72, four such arms being provided according to the structure of Figs. 1, 2 and 3. The arrangement is such that the arms 72 are subjected to a rocking or oscillating movement, each about its pivot 71, and in the plane of the axis of rotation of the reel member, being the plane of shaft 50. Each of the arms 72 is biased outwardly or away from the position shown in full lines (Fig. 2) to the position shown by dotted lines. A spring 73 or its equivalent, anchored as by a cap screw 74 to the sleeve portion 56, accomplishes this result. Serving, however, to limit the outward throw of each of the arms 72, is a cam member 75, securely carried by a stationary portion of the structure, for example to one of the bearing arms 51. The camming face of member 75 is disposed in a generally vertical plane, as shown, and coacts with a normally horizontally disposed follower roller 76, pivotally carried between ear portions 77. From Figs. 6 and 7, illustrating the shape of the cam member 75, it will appear that, as the reel member is rotated, the arms 72, in following the cam 75, will be rocked from the position shown in dotted lines (Fig. 2), to the position shown in full lines.

Each of the swingable arms 72 carries at its outer or free end, a head portion 80, the head portion being formed as a part of or secured to the associated arm. Each of the arms 72 is further provided with spaced apertured ear portions 81 serving to carry a pivot, extending through an additional follower roller 82, which, as the reel structure and the associated arm 72 are rotated to a position to bring the head 80 beneath a stationary arcuate cam or track 83, are engaged by the cam track in such manner as to bring the pressing head 80, into metal-forming adjacence with the periphery of the reel structure 55. This relation of parts best appears in Fig. 1. It will also appear that, in the example shown, during substantially 180 degrees of rotation of the rotary reel structure 55, the heads 80 are thus firmly pressed toward the surface of the rotary reel structure 55, and into forming contact with a strip of metal carried by the periphery of the reel.

Offset from, and mounted exteriorly of the stationary cam track 83, is a cam or track 84 (Figs. 1 and 2), the two stationary cam tracks being suitably mounted upon stationary portions of the structure, as by brackets 85. The cam track 84 corresponds generally in trend to that of the track 83, but is of somewhat greater curvature. As will be noted from a comparison of the curvature of the cam tracks 83 and 84 in Fig. 1, the track 83 is formed on a substantially uniform radius with respect to the center of shaft 50, while the track 84 is, for a purpose hereinafter noted, constructed on a gradually decreasing radius with respect to the axis of shaft 50.

Each of the heads 80 preferably consists of a solid casting or block portion, provided with a generally radial guideway 86. Slidably disposed in each of the guideways 86 is a reciprocable slide or head 87 (Fig. 3). Since the slides or crossheads 87 may be uniform in the four forming assemblies shown, for example as in Fig. 3, a description of one will serve as a description for all thereof. The innermost end of each of the slides 87 is formed with a pair of partly cylindrical recesses 88, of transverse trend, serving to receive correspondingly formed rounded ends of legs 89 biased toward each other as by a spring 90. Pivotally connected to each of the legs 89 is a furcate arm provided laterally with a guide roller 92, and at its innermost or free end with a forming roller 93. These innermost or free ends of the legs 89, are chamfered or beveled as at 94, at a point directly above the apex of the cutting anvil 62, above described.

Operation of the slides or crossheads 87 is effected, upon rotation of the forming reel, through an outward extension or integral portion of each of the guides 87, indicated at 95. The outer or free end of each of the portions 95 is provided with paired apertured ears 96, receiving therebetween a pivot pin of a follower roller 97, which, through a portion of the range of rotation of the reel structure, is engaged by the inner or camming surface of the track 84.

From the gradually decreasing radius of track 84 with respect to the axis of rotation of the forming reel, being the axis of shaft 50, it will appear that as the reel structure of Fig. 1 is moved anti-clockwise, the several slides or crossheads 87 are moved inwardly of the heads 80, and along the associated guideways 86. It will be noted that each of the heads 80 is retained within its guide passage by a removable cover plate or the like 98, assembled to the body of the head by suitable screws.

Since the several crossheads 87 are actuated only in a direction inwardly of the several heads 80, by the cam track 84, it is necessary to provide for their return movement, suitable means for this purpose being found in the example of Figs. 1, 2 and 3, in a tension spring 99 connected at its outer end to a fixed anchorage or pin 100, and at its inner end to a pin 101, extending through a suitable slot 102 in the cover plate 98.

As best appears from Fig. 3, the example of the first few figures, is an arrangement utilized for the formation of articles of metal strip, and it may be employed, for example, in shaping antisplitting devices of the types used in connection with railway cross ties or in the end section of other timbers. The particular article illustrated in Figs. 1 and 3 is characterized by oppositely curved C shaped terminals, and the shape of the article arrived at according to the shape or shapes of the several forming blocks or dies 103, characterized by convexly rounded terminal shoulders 104. The die bodies are preferably formed separate from the central portion of the forming reel 55, in order to permit replacement and substitution of dies of different contour according to the desired shape of article to be produced.

The structure for ejecting the formed antisplitting devices or irons from the reel, according to the exemplary showing of Figs. 1, 2 and 3 consists of a plurality of parallel rods 105, each provided with an outward projection 106 disposed at one end of the associated rod, and positioned so as to engage, laterally, the strip of material A, from which the irons are to be formed. It will be understood, of course, that each of the die bodies 103 is transversely apertured so as to provide a plurality of guide passages for the rods 105, the three outermost passages being open at the periphery of the forming reel or of the die body 103, so as to permit the extensions 106 to operate in guided relation the slot resulting from the open side of the passage. The operation of the ejector will probably best appear from Fig. 2, wherein it is seen that three of the rods 105 are aligned and that all of the rods are connected by a substantially rigid T-shaped structure 107. The inner central rod 105 shown in section in Fig. 3, projects transversely through a passage inwardly of the reel portion 55, or of one of the die bodies, and is detachably engaged by a right angle cam follower 108, the outer or free end of which is provided with a roller 109, adapted when the reel is rotated so as to bring the associated ejector to a discharge position, to engage a stationary cam 110. The latter may consist of a wedge-shaped member disposed, for example, as shown in Fig. 1, and about to be initially engaged by one of the rollers 109. It will appear that the stationary cam 110 is held in definite angular relation, being formed as a part of or secured to the stationary cam 57, attached to one of the bearing arms 51.

Before proceeding to a description of further structure, the operation of Figs. 1, 2 and 3 may be briefly described as follows: It is contemplated that the strip A be supplied from a supply roll or reel 111, in which form strip material of substantial gauges is regularly available to the trade. A preferred arrangement appears in Fig. 11, wherein the supply reel or roller is mounted on a suitable drum 112 carried between standards 113, the drum 112 being provided with a braking periphery, by preference engaged by an adjustable brake drum 114, the braking tension of which may be adjusted through a hand screw 115 extending into a threaded socket 116.

As the strip is drawn off of the supply roller, it is directed through a plurality of suitably spaced staggered pins 117 (Fig. 1), which however may satisfactorily take the form of rollers, the staggered arrangement and spacing of the elements being such that as the strip is drawn therebetween, any kinks or irregularities tend to be straightened or ironed out before the strip engages the periphery of the forming reel. From Fig. 3, showing the cover plate 64 removed for clearance, it appears that shortly following the initial contact of the strip with the body of the reel and particularly the dies 103, one of the heads 80 is pressed downwardly in a position generally between a pair of the adjacent dies 103. The shapes of the dies, the reel and the inner surface of the heads are such that as the head is brought downwardly to the first position shown by Fig. 1, under the influence of cam track 83 and roller 82, the subjacent portion of the strip is deflected or deformed in such manner that the strip is grippingly held between the head and the forming reel. It will appear that from this point of initial formation of the strip, and as the forming reel moves counterclockwise (Fig. 1), the continued coaction of cam track 83 and the follower roller 82, serves to keep the head in close adjacence with the strip upon the periphery of the reel. During such rotation of the reel, two events concurrently take place, namely, the larger or nose portion of the stationary cam 57, acting on the individual followers 60, forces one of the cutting anvils 62 outwardly to bring the apex or point thereof beneath the strip. At about the same time the coaction of cam track 84 and follower 97 serves to bring the free chamfered ends of the levers 89 against the opposite surface of the metal strip. The ensuing inward radial movement of the legs 89 under the influence of crossheads or slides 87, is such that the strip is severed, immediately following the first position of the parts as shown in Fig. 3. The second step consists, as shown in the second position identified with the lower left hand cutting assembly of Fig. 3, in the rollers 93 coacting to bend the resulting free ends of the strip about the shoulders 104 of the dies 103. This action is facilitated by the spreading or camming effect of the wedge shaped cutting anvil 62. The forming movement aforesaid, provided by the rollers 93, working against the free severed ends of the strip, continues to the third position of the parts shown in the lower right hand part of Fig. 3, wherein the curved reentrant terminals of the irons are completely formed. To the end of providing independent guiding means for the furcate roller-carrying arms 91 in the formation of the terminal portions of the irons, I prefer to provide in either or both of the reel body and cover plate 98, divergent guideways 118, serving to receive and direct the rollers 92 of the associated paired forming elements 91.

The angular positions of the several parts of Figs. 1 and 3 correspond throughout the two figures, from which it will appear that the strip-formed element indicated generally at 119 is, upon reaching the fourth position of the figures, completely formed; at such time it will also be seen that the follower roller 109 starts to engage the stationary cam 110 as a result of which the ejector assembly is moved to the left (Fig. 2) or in a direction such that the projections carried by rods 105 move the finished iron laterally from the reel body 55, whence the formed objects are deposited, as by gravity, into a suitable receptacle, or onto a conveyor, not shown).

While I have shown for completeness of illustration, the device of Figs. 1, 2 and 3 as provided with reciprocable cutting anvils such as 62, it will be understood that the assembly is entirely operative for the formation of certain types of strip metal articles, without the necessity of any radial movement of elements 59, etc. In the latter case the cutting anvil 62 or some equivalent thereof would be mounted, preferably detachably, to the body of reel 55, as shown by Figs. 8 and 9. In the latter figures the cutting anvils 120 are provided directly with a mortised connection 121 within a recess 122 of the reel body. The modification of Figs. 8 and 9 is illustrative of a preferred example for producing strip objects, such as anti-splitting devices, characterized by an angulate, for example, a right angular terminal 123. Figs. 8 and 9 illustrate respectively the preliminary and final positions of the parts, wherein the crossheads 87 may be the same as in the structure of Figs. 1–3, but provided with somewhat modified types of cutting and forming arms or levers 124, carried in depending pairs by each of the cross-heads 87. The inner ends of the levers 124 are chamfered or beveled as at 125, and each of the levers 124 serves to carry a slide 126 mounted for reciprocal movement with respect to the associated lever. The slides are movably retained, each in its associated arm, as by a mortise connection 127, and a screw 128; the screw being operable, with the slide in a slot 129. Each of the slides 126 carries exteriorly of its free end, a forming roller 130. It will appear from a comparison of Figs. 8 and 9 that the initial downward movement of the crosshead coacts with the chamfered portions 125 of levers 124 to sever the strip upon the apexed anvil or cutter 120. The continued downward movement of levers 124 results in the rollers 130 bending the free ends 123 of the irons, for example to about a right angled position, as appears in Fig. 9. The reciprocal movement of the slides 126 in the levers 124 permits retraction of the levers and forming rollers, without any substantial or harmful abrasion of the ends 123.

It will be understood of course that Figs. 8 and 9 are illustrative of modifications which may be applied, for example, to the assembly structure of Fig. 1 and that the sequence of events and operations incident to the formation of devices according to Figs. 8 and 9 may be, but for exceptions noted, substantially the same as the formation of the strip objects illustrated by Figs. 1, 2 and 3.

There is best illustrated by Figs. 12 and 21, an assembly of a modified, although for certain purposes equally preferable form of a rotary die for cutting and forming purposes. Referring presently to Fig. 21, a rotary forming reel 140, is secured as by a key or the like 141 to a shaft 142 provided, like shaft 50, with a suitable gear or power pulley (not shown) by which rotative movement is transmitted thereto. The shaft 142 is carried for example, in suitable bearings 143 formed on or as parts of supporting standards 144. By way of showing the adaptability of the principles of the invention for forming different types and numbers of objects during each revolution of the rotary die, the device of Figs. 12 and 21 is shown as provided with only two forming bodies or dies 145, so shaped that there results as the strip is wrapped upon the reel, an anti-splitting device or iron, of open-side polygonal form characterized by inturned angulate terminals, the body of the formed iron being indicated at 146 and the terminals thereof at 147.

Journalled in pairs at opposite locations on the body 140 of the rotary forming reel, are stub shafts 148 (Fig. 21), a hollow journalling extension 149 being provided on the reel body therefor. On the rear face of the reel body each of the shafts 148 is provided with a pinion or gear 150 (Fig. 15), keyed as at 151 to a reduced portion of the associated shaft 148. Each of the shafts 148 is further extended rearwardly of its pinion 150, as into a splined portion 152 (Fig. 22) serving to receive an apertured internally splined end 153 of an actuating or camming arm 154. Although each of the paired shafts 148 may be provided with its individual arm 154, through the provision of meshing gears 150, a single such arm will generally suffice for action of both shafts of the pair. A set screw or the like 155 facilitates the removal and replacement in adjusted positions, of the arm 154 on the splined end 152 of each or one of the shafts 148. Carried at the opposite end of shaft 148 is a cutting and forming head 156 which may be secured as by a set screw 157 to the shaft 148. The head 156 is provided with an undercut or relieved face, as appears from Figs. 12 and 21. The exact nature and conformity of the undercut areas, and the resulting edge portions, are determined according to the nature of the terminal portion to be formed, as on the iron 146. According to the structure of Fig. 12 the uppermost cutting and forming assembly is so arranged that there results, on the head 156 of one of the cutting and forming elements, an edge 158 subtended by an apexed cutting anvil 159, to the left and right of which are disposed respectively, replaceable forming elements 160 and 161, being parts of and coacting with the die bodies 145. Each of the elements 159, 160 and 161 is provided with a mortised connection 162 with the body of the reel, and the three elements 160, 159 and 161 are individually secured in position, each by a screw threaded member 163, consisting conveniently of a cap screw. By this provision it will appear that the several cutting and forming elements carried by the reel proper may be easily removed and replaced, either for the purpose of replacement to compensate for wear, or for the purpose of employing elements of different shapes.

As illustrative of the potentialities of the device for punching as well as for cutting and forming, I have illustrated one of the faces of one of the heads 156, provided with a detachable punching member 164 which, according to certain requirements, may be employed, as the end of the strip is cut and formed, to perforate such end. The punchings resulting from the action of member 164 are received in a channel or passage 165 and discharged, as by centrifugal force, or a displacement member (not shown) through an opening 166 in the side of the element 161.

As an aid in forming the ends or terminals of the irons after the initial cutting operation by edge 158, I prefer to provide a plurality of forming elements, such as rolls or rollers, 167 which may be formed of hardened metal and replaceably disposed for example, as shown in Fig. 12, the purpose of which will more fully hereinafter appear.

Actuation of the paired shafts 148, and hence of the paired cutting and forming heads 156, occurs under the influence of one or more stationary pins 168 (Fig. 15). As preferred, each of the pins 168 serves to carry a roller 169 so that, as the forming reel body rotates, and the roller 169 is impinged by the inner curved surface of the several arms 154, there results a rolling action between the elements, rather than a sliding action, thus minimizing frictional losses. The paired cutting and forming heads 156, through shafts 148 etc., are kept in a normal, inoperative position as appears in the upper portion of Fig. 12, through a spring 170 connected between a pin 171 secured to the reel body, and a pin 172 carried by the associated arm 154. It is my preference to attach the pins such as 168, to a suitable extension or bracket 173 therefor, carried by some relatively rigid stationary part of the machine, for example one of the standards or arms 144 (see Figs. 15 and 21).

It is my preference, in order to facilitate replacement of the cutting and forming heads carried by shafts 148, to provide the heads proper with a mortised connection 174 (Fig. 23), in which case securement of the head to an integral collar portion of shaft 148 may be made by the set screws 157.

In the structure of Figs. 12 and 21, a device for ejecting or kicking off the finished irons is shown in connection with each die body portion 145, as consisting of three transversely slidable rods 175, each provided with an ear or projection 176, a suitable transverse passage being provided for each of the rods 175, and the passages being open along their outer sides so that the projections 176 may travel through the resulting slotted openings. A fourth reciprocal rod 177 is provided and connected to the rods 175 as through a T-shaped structure 178 (Fig. 13), the rod 177 extending through the body 140 of the forming reel and provided with an angulate extension 179, the outer end of which carries a cam follower roller 180, so disposed, when the reel member is in certain angular positions, as to engage a fixed cam 181 carried by a stationary part of the structure such as one of the bearing arms or standards 144. The coaction of roller 180 and cam 181 is opposed by a tension spring 182 anchored at one end to the body 140 and at the other end to a pin 183 carried by the extension 179. The action of the ejector of Figs. 12, 13 and 21 may be, in all important respects, the same as that of the structure identified with parts 105 et seq. of Fig. 3.

The operation of the structure of Figs. 12, etc., is thought to be apparent from the foregoing description of Figs. 1 et seq., but it may be noted that as the forming reel body is rotated counterclockwise or in the direction of the arrows of Fig. 12, the strip A is drawn through an assembly of staggered pins or rollers 117 which, as in Fig. 1, may be carried by a suitable stationary brace. The strip from the supply roll is thus fed through this straightening device, whereby all irregularities are removed, and is then wrapped upon the forming reel body 140 under the influence of rotation of shaft 142, in the manner suggested by Fig. 12.

It will appear from Fig. 12 that as the strip A is wrapped upon the reel body and as the cutter and former assembly continues movement in the direction of the arrows, the strip A remains within the rockable cutting and forming heads until the reel reaches such position that the roller 169 impinges the inner arcuate surface of the cutting lever 154. Continued rotation of the reel thus causes the arm 154 to be reciprocated to move the corresponding cutter head 156 through an angle, say of 90 degrees, during the first part of which movement the cutting edge 158 shears the strip A upon the apex of the cutting anvil 159. As will appear, continued rotation of the forming reel while the roller 169 continues to bear against the arm 154, causes the pins 167 to engage the free ends of the now severed strip, and to bend such ends inwardly of the ends of dies 145 and particularly about the forming elements 160 and 161. The first effect upon the terminal portions of the severed strip will be to form a single angulate entrant portion. If desired, this may be followed by the formation of an additional tip portion which is bent away from the first entrant so as to lie, as appears in Fig. 12, generally parallel to the face or body portion of the iron. As the rotation of the forming reel 140 continues, and the terminal portions of the iron are completely formed, the iron will overlie the die 145 now disposed in a position at the right of Fig. 12. As the formed iron and the underlying die approach this position, however, the roller 180 is engaged by the cam 181 in such a manner as to reciprocate the rods 175 and 177 laterally or transversely of the die. The projections 176 now serve to eject the formed iron by sliding it laterally from the face of the die 145, whence the formed object may fall by gravity to a suitable receptacle (not shown), or onto a conveyor of any suitable type (not shown).

I have illustrated for the purpose of illustrating the variety of body and terminal shapes possible to be imparted to the formed irons or other objects, the paired forming heads 156 of Fig. 12 as being of somewhat different conformity or configuration. The rollers 167 associated with the left hand forming head in the upper portion of Fig. 12 will serve to bend the extreme terminal portion of the strip outwardly of the first angular entrant portion, whereas in the lower left hand forming and cutting arrangement of Fig. 12, the corresponding extreme terminal portion is bent inwardly, the cutting and forming head paired therewith being adapted to form an outwardly directed terminal tip. The devices of the present invention, as seen from the drawings, are particularly adaptable to the formation of an object of strip material having bent terminals of opposite trend with respect to the body. It may here be observed that the action of rollers 167, and corresponding elements of the modifications, in forming the metal strip, is distinctly a rolling engagement with the strip, rather than a rubbing or sliding action. Thus the strip is not, by this arrangement, visibly abraded or scored, as has been experienced with certain older forms of shaping mechanism.

It will appear that, according to the arrangement of Figs. 12 and 15, employing only a single cutting arm 154, for each pair of cutting and forming heads, that as the arm 154 is actuated counterclockwise (Fig. 15), the companion head geared thereto through pinions 150 will be rotated clockwise or in the opposite direction, so that the two heads serve concurrently to form the two terminal portions by bending each inwardly of the die body.

Since with an arrangement characterized by only two dies 145 and two pairs of cutting and forming heads 156, there may at times exist a condition in which the strip on the reel is completely severed from the supply strip drawn through pins 117, I prefer to employ a clamp for preventing any reverse movement of the strip. Two such strip-clamps are shown in Fig. 12 at diametrically opposite points, and pivotally secured as at 185, to the journalling extension 149 which accommodates the shafts 148 for the cutter heads. The two strip clamps illustrated each consists of a relatively rigid angulate lever 186, provided intermediately with a rearwardly extending roller 187, pinned to the lever 186. The face or gripping surface of the lever 186 consists of a relatively stiff bow spring 188 adapted, when the lever 186 is cammed in a direction toward the body 145, grippingly to engage the strip A. The strip-engaging or -gripping position of the clamp 186 best appears in the lower left hand portion of Fig. 12 and also in Figs. 17 and 19.

Actuation of the clamping lever 186 is accomplished through a camming action of the periphery of the forming head 156 adjacent the clamp, the periphery of the head serving to engage the roller 187 in a manner to bias the spring-carrying foot portion of the clamp against the surface of the strip, for example as in Figs. 16 and 19. The clamp is permitted to move about its pivot 185 and to be raised from the surface of the reel through the provision of a notch 189 (Figs. 17 and 19) which notch serves to receive the roller and permits the clamping arm to assume a position free of the strip and reel so that the strip may be drawn between the clamp and reel body. Through the provision of the strip clamp identified with lever 186, it will appear that, not only the strip, but each of the formed irons, are held against any withdrawal or disturbance due to the tension of the strip A from the supply reel, until the reel rotates to such an extent that cam 181, coacting with follower roller 180, ejects the finished article from the reel. The operation of the cutting and forming heads 156 is further illustrated by Figs. 16 and 17, illustrating respectively, the initial and final positions of the heads. It will appear that the clamping lever 186 serves to position the strip A with respect to the reel, until such time as the first terminal portion is bent initially to an extent sufficient to prevent the strip pulling back from the reel. The location and function of the several pins 167 are also further illustrated by Figs. 16 and 17. During the rocking or reciprocating movement of the two shafts 148 of each of the cutting and forming assemblies, it will appear that the camming roller 169 first engages, by rolling action, the inner surface of the free end of cutting arm 154, and thereafter, as the reel is rotated, attains the position of Fig. 17, at which time the spring 170 becomes fully extended or loaded, and at which time the terminals of the objects are completely formed. Upon the reel body 140 being rotated slightly past the position shown in Fig. 17, the loading of spring 170 serves immediately to return the cutting and forming heads, together with lever 154, to their initial positions shown in Fig. 16. In the position of parts of Fig. 16, the cutting surfaces of the heads clear the strip so that the supply of metal may be freely drawn in from the supply reel, and thus the rotor or forming body continually supplied with the preformed material.

It will appear possible that the principles of the invention as embodied in a pair of oppositely rockable or reciprocally movable forming heads, may be utilized, due in part to the undercut ends of the die bodies, to form terminal shapes of strip objects in an almost endless variety of types. As illustrative of the adaptability of the rockable forming heads to the production of curved terminals, as distinguished from the purely angulate forms of Figs. 12, 16 and 17, there is illustrated by Figs. 18 and 19, a modified form of the cutting and forming elements. The figures show, respectively, the initial and final positions of the rockable heads. The head 200, only one of which is illustrated for simplicity, includes an arcuate arm portion 201 provided with a furcate lever 202 pivotally connected to the arm 201, and provided at its outer end with a forming roller 203, and a lateral guide roller 204. In Fig. 18, as the head 200 is reciprocated counterclockwise or in the direction of the arrow, a cutting edge carried by a companion head (not shown), serves first to shear the strip A and the swinging movement of the lever 202 is determined by engagement of the roller 204 in a guide passage 206 therefor. The general shape of this passage corresponds to that of an undercut forming face 207 which terminates in a curved re-entrant portion 208, on a modified form of die or block 209. The course taken by the curved arm 201, roller 203, etc., as the head 200 is reciprocated, will appear at once from a comparison of Figs. 18 and 19, the latter illustrating the terminal of the iron after its complete formation. Relation of the parts such as the roller 203, the arm 202, etc., will further appear from Fig. 20 showing a section of the structure of Fig. 19 in its final position.

As heretofore described, the heads 156, 200, etc., characterizing the cutting and forming assemblies, are detachably carried each by its associated shaft 148. Since with a given assembly, cutting and forming heads of a variety of types may be substituted, together with appropriate forming units carried by the die body such as the parts 160, 161, etc., of Fig. 12, it is desirable for certain purposes to provide for a variable range of angular movement of the shafts 148, or it may be desirable according to dissimilarities of the paired forming heads, to provide for a greater range of movement for one of the heads, than for the companion unit. A modified arrangement lending itself to ready alteration of the ranges of throw of the individual cutting and forming elements, is shown by Figs. 34, 35 and 36, wherein a pair of the heads 156 are provided, each with an individual actuating arm 210 and 211. The shafts by which the heads are carried in Fig. 34, are not geared together, but each shaft is individually operated by the camming action of a roller 212, the rollers being carried by normally stationary pins 213, each mounted in an adjustable slide 214. Each slide 214 is mounted for adjusting movement in a guideway 215 and each pin 213 secured in adjusted position as by a nut and bolt assembly 216 (Fig. 36). The pins 213 may be mounted on a stationary bracket such as 217 (Figs. 34–36) which is supported, for example, on one of the bearing arms such as 144 in which the shaft 142 is journalled. Each of the arms 210 and 211 may be provided with an individual return spring, say of tension type, as indicated at 218.

Figs. 28, 29, 30, 31 and 32 illustrate still further modifications of the reciprocal cutting and forming heads, showing the adaptability of modified forms thereof in producing different designs and shapes of terminal structures. In Fig. 28 a head 220 is shown as paired with a companion head 210 of different form, the two heads being shown as spaced to provide a suitable length of the strip A therebetween whereby to supply sufficient metal for a widely curved re-entrant terminal on one of the irons. In the assembly of Fig. 28, cutting of the strip is effected upon initial movement of the head 221 through the shearing effect of an edge 222 coacting with an edge 223 beneath the strip and carried at the end of one of the dies such as 145. Rotation of the two heads 220 and 221 takes place in opposite directions as shown by the arrows, and the final position of head 220 is indicated by Fig. 29. It will be noted that the head 220 serves to carry a single arcuate arm 224 provided with a forked or furcate end between which is pivoted a forming roller 225. The die or anvil portion underlying the strip A adjacent the roller 225 is provided with a hardened insert or pin 226 over which, as appears from a comparison of Figs. 28 and 29, that length of metal between points 223 and 226 is drawn into the arcuate recess 227 as the head 220 is partially rotated. The resulting terminal structure best appears in Fig. 29.

The head 221 of Fig. 28 illustrates an arrangement wherein the companion terminal is bent into substantially right angular shape. In Fig. 30 the principle of formation is substantially the same as in the structure of Fig. 29 except that the curved re-entrant portion is of a trend outwardly or divergently of the body of the iron, instead of convergent with respect thereto. The forming head 228 of Fig. 30 pivotally carries a lever 229, provided at a forked outer end with a roller 230 and a guide roller 231 which engages, near the beginning of rocking movement of the head 228, a curved guide groove 232 from which it results that as the head 228 starts its rocking movement in the direction of the arrow, the swingable arm 229 is initially given a suitable downward movement. Only the final position of the arrangement of Fig. 30 is shown. It is thought to be obvious as to operation, from the description of preceding figures.

Figs. 31 and 32 illustrate respectively, initial and final positions of a still further modified form of the cutting and forming elements, in each of which the cutting and forming head 235 is provided with a cutting end 236, adjacent to which the head is provided with a slot 237 of a depth and thickness easily to accommodate the portion of the strip A within the head. Shearing takes place upon initial movement of the head 235 between the edge 236 and a stationary cutting edge 238 formed as an integral or detachable portion of one of the dies 145. The arrangement of Figs. 31 and 32 illustrates the adaptability of this modification to the formation of an angulate terminal consisting of a primary entrant portion extended, say at an angle of 90 degrees to the face or body of the formed object.

Proceeding now to a description of Figs. 24 and 25 illustrating still other useful modifications of the reciprocal cutting and forming heads, Fig. 24 illustrates in final position, two heads indicated respectively at 240 and 241, while Fig. 25 illustrates the same parts in their positions of rest prior to cutting of the strip and the forming of terminals thereon. The head 240 is characterized by a substantially semi-circular undercut portion 242 coacting with a correspondingly curved extension 243 on a die element 244. The die shoulder is undercut to provide a plane portion 245 subtending the curved part 243 and a drag pin or insert preferably of hardened material to resist wear, as indicated at 245. According to this arrangement cutting action takes place through a pair of edges 246 one on each of the heads 240 and 241, the pin 245 being located just inwardly and rearwardly of such edges. The edges coact, upon initial movement of the heads, with the apex of the cutting anvil 247 to shear the strip, the action after shearing of the head 240 being apparent from a comparison of Figs. 24 and 25. The head 241 is characterized by a lesser curved undercut portion 248, merging into a plane forming surface 249 which coacts with the corresponding surface 250 subtended by an angulately undercut arm 251, the parts 250 and 251 resulting from the formation of a die element 252. The nature of the terminal resulting from the coaction of heads 241 and the die element 252 best appears in Fig. 24.

Figs. 26 and 27 are illustrative of further modifications in form of the terminals, through the use of modified cutting and forming heads 253 and 254. As in the case of Fig. 28, the two heads 253 and 254 are shown as spaced a substantial distance so as to provide a length of metal requisite to the formation of a terminal such as shown in connection with head 253, by Fig. 27. In the arrangement of Figs. 26 and 27 cutting takes place upon initial rocking movement of the heads, through coaction of a cutting edge 255 and a coacting stationary edge 256, on a cutting anvil or die 257. Hardened forming rolls or pins such as 258 are so located on the heads 253 and 254 that the metal overlying the anvil 257 is, following cutting, withdrawn to lie along the walls of a recess 259 within a die portion 260, resulting in the terminal appearing at the left, in Fig. 27. The action of head 254 results from an arcuately recessed portion 261 coacting with a corresponding male portion or the die 262, resulting, upon actuation of the head, in a terminal structure appearing at the right (Fig. 27). It will be seen that the pin 258 carried by the head 254 coacts with the outermost angulate shoulder of die 262 in bending the curved tip of the resulting terminal, into its final position.

A modified arrangement of parts for releasing the finished or formed articles from the reel body, is illustrated by Fig. 33, wherein there is employed a modified form of die body 265, over which the strip A is wound, as in the case of the reel or body 140. In the arrangement of Fig. 33 the terminal die structures 266 are each pivotally connected as by a pivot pin 267 to a link 268, the link being pivotally connected as by an additional pin 267 to a rocker 269. The devices are arranged in pair, one assembly thereof being disposed on each side of the shaft 270. Each of the rockers or arms 269 is provided centrally with, and secured to a stub shaft 271, journalled in the body 265 of the forming reel and provided outwardly and offset of its axis of rotation, with a pin 272. It will be observed from the relation of parts in Fig. 33, that the links 268, rockers 269, etc., constitute a toggle assembly, so that rotation of the rocker serves to withdraw the two links 268 and with them, the terminal dies 266 associated therewith. The action of the device is thought to appear from the two positions of the separate assemblies of Fig. 33, showing the pin 272 of the right hand assembly as engaged by a stationary arm 273, when the reel 265 is rotated to a predetermined position. The pin 272 being offset from the center of arm 269, serves, upon being engaged by the pin, to rotate the arm 269 in a direction to retract the terminal dies 266. Thus the die elements, upon being released from the formed terminals of the completed object, permit the object to be thrown away from, or off of the reel body 265 under centrifugal influence as the rotor or reel 265 is rotated. The ejector arrangement of Fig. 33 is of advantage in connection with certain of the more deeply curved or bent types of terminals, for example, those characterized by re-entrant portions of such a nature that lateral ejection of the formed object, from the die, is rendered difficult.

There is illustrated by Figs. 37, 38 and 39, a modified arrangement of reciprocal cutting and forming elements embodying certain of the principles of each of the arrangements of Figs. 1, 2 and 3, and of Figs. 12 and 21. Figs. 37 and 38 illustrate, respectively, the initial and final positions of the parts employed for cutting and forming strip metal objects, particularly the terminal portions thereof. In this arrangement a shaft 275 serves to rotate a die body 276, there being provided, as in the arrangement of Figs. 1, 2 and 3, a stationary cam 277 which serves, as the forming reel or rotor 276 is revolved, to effect a reciprocal movement of spaced opposed crossheads or slides 278 through cam follower rollers 279. The slides or crossheads 278 each serves detachably to carry a cutting anvil 280, the crossheads being constrained to radial rectilinear movement through a suitable guide passage 281, there being one for each of the crossheads. Carried in fixed relation by the forming reel, is a journal extension indicated generally at 282, formed to provide a central radial guide passage 283, at the opposite sides of which are journalled rock shafts 284, serving to carry, after the manner of Figs. 12 and 21, complete or fragmentary pinions 285, meshed with opposite rack faces on a radially movable slide 286. Each of the shafts 284 is provided with an actuating arm 287, coacting with normally stationary camming rollers 288 carried in adjusted relation, for example, as shown by Figs. 34 and 36, in a bracket 289, (Fig. 39).

The coaction of rollers 288 and arms 287 may be as described above in connection with the structure of Fig. 34, the impingement of rollers 288 on arms 287 serving, as clearly appears, to reciprocate the slide 286. Carried by the inner end of each slide 286 are a pair of arms 290, the structure and appurtenances of which are shown as being identical with the corresponding elements 91, 92, 93, etc., of the arms 89 of Fig. 3. The action of the parts is thought to be fully evident from a comparison of Figs. 37 and 38 wherein it appears that reciprocal movement of the shafts 284 in a direction to force the slide 286 inwardly of the reel, to bring the arms 290 into cutting engagement with the strip, is effected through the rollers 288 and arms 287. After cutting and formation of the terminals of the strip element, the slide 286 is drawn outwardly as the arms 287 are restored to normal position under influence of springs 291.

The mounting of the parts may be as suggested in the end elevation of the assembly of Fig. 39, wherein a shaft 292 serves to carry the modified rotor assembly, generally pointed out at 293. The type of ejector as shown in Figs. 37 and 38, corresponds to that employed in connection with the structure of Figs. 12 and 21 and may be identical therewith in all important respects.

It has been determined that, when employing a forming reel provided with two forming dies, as illustrated for example by Figs. 12 and 37, it is more practical to direct the feed strip A onto the reel, from a position at a slight angle to the plane of rotation of the reel. By this expedient the strip is kept clear of the reel prior to the point where it first engages the periphery thereof, and thus does not interfere in any manner with the operation of kicking off or ejecting the formed metal article. For the purpose of directing the strip laterally into its proper initial reel-engaging position, I prefer to employ an arm such as 294 (Fig. 21), having an angulate end portion immediately adjacent the strip at the point where it is desired that the strip shall first engage the reel. This downturned end portion is provided with a roller 295 serving edgewise to engage the strip, and thus direct it onto the winding and forming surface of the reel. In case the forming reel is of polygonal or other hexagonal contour, as in Figs. 12 and 21, provision is made, as hereinafter described for causing the arm 294 and roller 295 to follow the vertical movement of the preformed strip as it is wound onto the polygonal body of the reel.

It is my preference, as conducing to continuity of output, to provide for the continuous feeding of the strip A, from supply rolls thereof, onto the rotary forming or die structure. The reels of strip material, particularly that of substantial gauges, say in the range of 10 to 14 gauge steel, are necessarily limited in the length of material they contain. The otherwise frequent interruptions of the forming process are provided against by the continuous feeding arrangement of Figs. 40, 41, 42, 43, 44 and 45. The side elevation of Fig. 40 shows the strip A brought from the supply roll, such as shown by Fig. 11, through a motor-driven friction drive arrangement, the motor of which is indicated at 300 (Figs. 40 and 42), the motor being mounted on a suitable bracket 301, carried by a support or standard 302. For the purpose of directing the strip at an angle onto the forming reel body such as 140, I prefer to provide a trough-like guide, 303, into and along which the strip A is fed from the supply reel, beneath a plurality of rollers 304 and over similar rollers 305, the rollers 304 and 305 being preferably disposed in staggered arrangement (Fig. 45) so as to be effective in straightening the strip or removing any kinks therefrom as it is passed between the rollers of the upper and lower groups. The normal course of the strip is as indicated at A in Figs. 42, 43 and 44. When, however, the strip from a given supply reel becomes exhausted or completely paid out, the trailing end of the strip A passes completely through and beyond the trough 303. Normally overlying the strip A in the trough, are a pair of arms 306 each biased, by an associated spring, against the strip, and thus so long as the strip is passing through the trough, are inoperatively positioned. The arms 306 are each connected for actuating a switch, housed by an enclosure 307 carried by the trough 303, the switches being disposed in parallel, in the feeder circuit of motor 300. The switches are indicated diagrammatically at 308 in such circuit. The arrangement is such that as the arms 306 are permitted to drop, as strip A passes out of trough 303, the switches 308 will close in sequence, thus energizing the motor 300, the provision of a plurality of the switches insuring against failure of either thereof to start the motor. A shaft extension 309 of the motor, serves to carry a centrifugal governor identified with weights or inertia elements 310 carried by arms 311, pivoted at their inner ends as at 312, to the shaft 309. Links 313, pivotally engage intermediate portions of the arms 311, and are connected at their opposite corresponding ends to an axially movable disc 314, secured to an endwise movable and rotary stub shaft 315. The stub shaft is provided with a shoulder 316 and a tapered strip-engaging portion 317.

It will appear from a comparison of Figs. 43 and 44 that the structure identified with parts 314, 315 and 317, is axially movable along shaft 309. Responsive to the rotation of shaft 309 by motor 300, there results an outward movement of weights 310 opposed by governor springs 318, each anchored at its inner end to the shaft, and at its outer end to one of the arms 311.

The action of the constant feeding apparatus is thought to appear from the description of its parts, but it will be noted that, during normal operation of the rotary die structure, such as 140, and the feeding of the strip A through the trough 303, the motor 300 and the centrifugal device are kept inoperative, since motor switches 308 are open. When, however, the supply strip A from a given reel becomes exhausted, the arms 306 will be urged downwardly for example under the influence of their springs. The resulting closing action of either of the switches energizes motor 300, and a strip A' from a subsequent supply reel having been inserted beneath the shaft portion 317, rotation of the motor will cause the subsequent strip end, first to be shifted to the right (Fig. 43), into the position shown by Fig. 44, thence to be advanced frictionally by the portion 317, upon being brought to the position initially occupied by the now exhausted strip A. The continued rotation of motor 300 advances the strip into and through the trough 303 to where it is again picked up by the rotary forming reel, such as 140, or any other of the types of reel described. As the strip A' however, passes beneath the actuating arm of the first of the switches 308, such switch will be opened, the motor 300 stopped, and the strip will subsequently feed itself under the winding action of the forming reel or rotor.

By the described continuous-feeding expedient, two supply reels may be at all times kept in adjacence to the rotary die assembly and a substantially uninterrupted supply of the preformed metal is assured.

Referring now to the structural provisions for guiding the preformed strip into adjacence with the periphery of a forming die of polygonal or other non-circular contour, it will appear from Fig. 40 that the arm 294 is swingably mounted, as through a pivot pin 320 carried by a suitably apertured portion of a stationary bracket 321. The arrangement is such that the arm 294 while permitted a pivotal movement, is confined, in such movement, to a substantially vertical plane. As the strip A initially engages the rotor body such as 140, it will oscillate vertically in following the contour of the body. In order to urge the strip into position, as it oscillates, a swingable arm 294 is kept in lateral adjacence to the strip as by means of a cam 322, (Fig. 4), the shape of which corresponds generally to the contour of the forming body or reel. The cam 322 may be mounted on the shaft 142 as indicated in Fig. 21, and secured to the shaft as by a key or the like (not shown). The arm 294 is provided with a cam-follower roller 323, which due to the weight of the arm, is kept in adjacence with the surface of cam 322, and thus the arm, as well as roller 295, receives a vertical movement, responsively to rotation of shaft 14 and the roller is always kept in edgewise engagement with the strip at or near the point where the strip first meets the periphery of the reel. A plan view of the arrangement appears in Fig. 41.

It will also appear as desirable, when employing a forming die body of non-circular contour, to keep the discharge end of the channeled guide or trough 303 disposed near the strip-receiving surface of the reel. Provision is accordingly made, as best appears in Fig. 42, for this purpose. The outer or discharge end of the trough 303 is provided with an extension 325 carrying a pivot pin 326, engaging the outer apertured end of an arm 327, secured to or formed as a part of the arm 294. The trough proper 303 is hingedly carried as by a pivot pin 328, and the pin 328 is in turn carried by the stationary strip-guiding frame, indicated at 329. Thus it appears that since the discharge end of the guide track or chute is carried by arm 294, and the inner end of the chute pivotally connected to the structure 329, the rotation of cam 322 will, corresponding to arm 294, impart a slight vertical oscillating movement to the free end of the strip-feeding trough and thus present the strip in constant predetermined relation to the surface of the forming reel.

It will appear from the foregoing description of a number of principal and modified embodiments of the invention, that it lends itself with only minor changes in structure, to the formation of a great variety and numerous types of objects, particularly those formed from elongate or strip metal stock. A number of the different types of cutting and forming elements have been illustrated and described in order to depict this wide adaptability. It will be understood that any of the several illustrated types of reciprocally movable cutting and forming elements may be applied to reels of either of the forms illustrated by Figs. 1–3, also to the type illustrated in connection with Figs. 12, 15 and 21, or to a structure embodying the further modification of actuating linkage illustrated by Figs. 37 and 38. So far as I am aware, the present embodiments represent the first successful structural organization by which lengths of strip material may be continuously cut and formed in concurrent operations by a rotary organization. This principle of operation results in distinct advantages in speed of production, reduction in cost of the equipment, lessened expense for dies, and improved continuity of output as compared with the structures heretofore prevailing for comparable purposes. The rotary die organizations of the present disclosure exhibit marked advantages in speed and production over the more usual apparatus of punch-press type, and in other ways serve fully and admirably to attain the several objects above set forth.

It will appear to those skilled in the art that a number of changes may be made in the parts described, in their combinations and arrangements, as well as in their purpose and usage, all without departing from the spirit and full intended scope of the invention, as defined by the appended claims.

I claim as my invention:

1. In a rotary metal-cutting and forming apparatus a rotatable forming body adapted to receive the stock to be treated, an element movable toward and from the body, complementary cutting and forming die portions, one thereof carried by the rotary body and the other by said element on opposite sides of the stock, means for maintaining the die portions in registrable relation as the body is rotated through at least a portion of its range of movement, and means for moving the last said element to and from the body for cutting and forming metal stock carried by the body.

2. In combination in a rotary metal-cutting and forming mechanism, a rotary metal-supporting body, metal cutting and shaping elements coacting with each other and disposed at opposite sides of a strip of metal carried by the body, means for rotating one of said elements responsively to rotation of said body, and means for reciprocally moving one of the elements as the body is rotated.

3. In a rotary metal-cutting and forming apparatus, a rotatable body, die elements carried by the body and shaped to form the metal stock under treatment, a structure rockably disposed exteriorly of the body, reciprocally-movable cutting and forming devices carried by said structure, means for causing a reciprocal movement of said devices as the body is rotated, and means for feeding a supply of the preformed stock in winding relation upon the body as the body is rotated.

4. In a rotary metal-forming and cutting apparatus, a rotor, die portions carried exteriorly of the rotor, means for winding a strip onto said die portions during rotation of said rotor, a guide structure rockably disposed exteriorly of the rotor, and a reciprocal cutting and forming device carried by said guide structure.

5. In a rotary mechanism for processing elongate metal stock, a rotor constituting a support for the stock under treatment, paired radially movable cutting and forming elements carried by the rotor, and adapted to engage opposite sides of the stock thereon, and camming means for effecting a movement of said elements radially of the rotor, responsively to rotation thereof.

6. In combination, in a metal cutting and forming device, a rotary metal-forming body, a forming shoe disposed for reciprocal movement to and from the body responsive to rotation thereof, a metal cutting element reciprocally disposed within the body, and a cam within the body adapted for actuation of the cutter element, as the body is rotated.

7. In an apparatus for cutting and forming metal strip, a rotary body on which the strip to be formed is adapted to be wound, a pair of reciprocally movable metal cutting and forming plungers, one thereof disposed internally and one externally of the body, and camming means for actuating said plungers as the body is rotated.

8. In a rotary apparatus for cutting and forming metal strip, a rotary body on which the strip to be formed is adapted to be wound, a pair of reciprocally movable metal cutting and forming plungers, one thereof disposed internally and one externally of the body, camming means for actuating said plungers as the body is rotated and camming means for releasing the formed metal object from the said body at a predetermined point in its range of rotation.

9. In apparatus for cutting and forming metal strip, a pair of coacting metal-gripping elements, one of said elements constituting a body on which the strip is wound, means for concurrently rotating said elements, means for relatively moving the elements into and out of metal-engaging relation as they are rotated, and means operable responsively to the rotation of said elements, for cutting and forming the metal while gripped between the said elements.

10. In apparatus for cutting and forming metal strip, a pair of coacting metal-gripping elements, one of said elements constituting a body on which the strip is wound, means for concurrently rotating said elements, means for rockably moving at least one of the elements to bring them into and out of metal-gripping relation as they are rotated, and means operable responsively to the rotation of said elements for cutting and forming the metal on the winding body.

11. In a mechanism for cutting and forming metal objects of strip material, a rotor, means for winding a strip of metal onto the rotor, a plurality of die bodies carried by the rotor, a plurality of forming shoes carried by the rotor and pivotally mounted for movement to and from the periphery of the rotor, a stationary cam coacting with said shoes for rockably moving same toward the rotor responsively to its rotation, a slide movably disposed in each of said shoes, a second stationary cam adapted reciprocally to actuate said slide when the rotor is rotated, a cutting anvil mounted for reciprocal movement internally of the rotor, a cam follower associated with the cutting anvil, a stationary cam coacting with said follower to reciprocate the cutting anvil, a pair of arms pivotally carried by the inner ends of each of said slides, the ends of said arms coacting with the cutting anvil for shearing into predetermined lengths the strip carried by said rotor, a pair of forming rollers pivotally carried by said arms and movable thereby into forming relation with the sheared ends of the lengths of strip, guides carried by the rotor and adapted to direct said rollers as the associated slide is reciprocated, and an ejector for the individual formed metal objects carried by each of the die bodies on said rotor.

12. In a rotary mechanism for processing metal stock, a rotary body having a metal supporting surface and adapted to receive the stock in wrapped relation, a rock shaft carried by said body, a metal cutting and forming element carried by said rock shaft and disposed to engage the metal on said body and means for actuating said rock shaft as the body is rotated.

13. In a rotary mechanism for processing elongate metal stock, a rotary die body having a metal shaping surface and adapted to receive the stock in wrapped relation, a rack shaft carried by said body, a metal cutting and forming element carried by said rock shaft and disposed to engage the metal on said body, and means for actuating said rock shaft as the body is rotated.

14. Apparatus for cutting and forming metal strip, including a rotary die portion adapted to receive the stock in wrapped relation, a pair of coacting metal-cutting and forming elements overlying the stock on said body, a shaft for each of said elements journaled in the said body, means connecting the shafts for concurrent actuation, and means for rockably actuating at least one of said shafts as the body is rotated through a predetermined portion of its path of movement.

15. In combination in a rotary die organization for cutting and forming metal stock, a rotary metal support, elements movable relative to and coacting with the said support for cutting and forming the metal thereon, an arm for actuating said cutting and forming elements responsively to movement of said rotary support, a stationary element adapted to abut said arm for the actuation thereof, and means for adjusting the position of said abutting member whereby to vary the range of movement of said arm and the cutting and forming elements.

16. In a rotary mechanism for processing metal strip, a rotary die body on which the strip is wrapped, a slide reciprocal exteriorly of the die body in a direction toward and from said strip, a metal cutting and forming structure carried by the inner end of said slide, a rack carried by said slide for the actuation of same, a pinion meshed with said rack, and means for imparting at least a partial rotation of said pinion for the actuation of said slide responsively to rotation of the die body.

17. In combination in a rotary device for cutting and forming strip metal, a rotary die body having a metal-forming periphery, elements coacting therewith for cutting and shaping the metal thereon as the body is rotated, a plurality of elements carried by and projecting in part from the die body into edgewise engagement with the strip thereon, a frame interconnecting said elements, a cam follower secured to said frame and a stationary cam disposed in the path of movement of said follower as the die body is rotated and adapted to actuate the frame in a direction transversely of the body for the ejection of formed metal objects therefrom.

18. In mechanism for processing metal stock, a die body adapted as a carrier for the stock to be treated, a cutting and forming member adapted for at least partial rotation adjacent the surface of said carrier, said member being provided with an undercut forming area, characterized by portions of a conformity corresponding substantially to the shape of a formed portion of the metal object, the forming member being adapted for rolling engagement with the stock shaped thereby and means for actuating the cutting and forming member relative to the die body.

19. In combination in a mechanism for processing elongate metal stock, a body constituting a support for the stock under treatment, a cutting and forming structure including a head mounted for at least partial rotation near the surface of the body and into and out of engagement with the strip thereon, said head being provided with a recessed portion, the walls of which constitute a shaping surface, and elements mounted on the head for rolling engagement with the metal stock formed thereby.

20. In combination in a rotary apparatus for cutting and forming elongate metal stock, a forming body on which the stock is wrapped, a cutting and forming head arranged for at least partial rotation and journaled near the surface of said body whereby to coact therewith in forming the stock thereon, said head being characterized by a recessed portion, and normally positioned with respect to the body so that the metal stock extends into said recess, certain of the walls of said recess being conformed substantially to the desired shaped portion of the stock, metal shaping rollers detachably disposed adjacent the recessed portion of the head so as to lie parallel to the axis of rotation thereof, one of the walls of the recess of the head being formed to provide a metal cutting edge, and means for actuating said head into strip-cutting and forming position responsively to a predetermined movement of the forming body.

21. A rotatably mounted metal-cutting and forming head for use in connection with a die body, said head characterized by a metal-receiving recess having walls to define the formed metal objects, an apexed portion associated with one of said walls and adapted, upon rotation of the head, to serve as a metal cutting element, and an element detachably carried by one of said walls and projecting into said recess and adapted, upon forming movement of the head, to serve as a punch for the perforation of metal stock within the recess.

22. A die body for use in shaping metal stock, consisting of a rotary shaping structure adapted as a support for the metal under treatment, a die element detachably disposed near the metal supporting surface of said rotary structure and provided with a shoulder over which the metal stock is adapted to be bent, and a reciprocable member mounted exteriorly of said body and rotatable therewith, said member, upon reciprocal movement, coacting with said shoulder for cutting and shaping the metal stock.

23. In combination in a rotary mechanism for cutting and forming metal strip, a rotary die body, a cutting anvil and a plurality of die elements carried by said body, a plurality of metal-cutting and forming heads mounted for reciprocal movement adjacent the surface of said body, a shaft and actuating means therefor associated with each of the heads, a detachable connection between each head and the associated shaft, and a detachable connection between each die element and the body, adapted to permit replacement of the heads and forming elements to vary the shaping of metal by the mechanism.

24. In a rotary apparatus for cutting and shaping lengths of elongate metal stock, a body structure adapted as a support for the stock under treatment, a recess in the body structure, a cutting element in said recess and adapted to engage one side of the stock on the said body, an element mounted for reciprocal movement exteriorly of the body and endwise presented toward the stock thereon, a pair of forming or shaping members pivotally carried by the end of said reciprocal element, the paired members being provided with cutting edges adapted to engage the side of the strip opposite the cutting element, and being shaped to form the severed ends of the strips, and means for actuating the said reciprocally movable element.

25. In a rotary metal-cutting and forming mechanism, a rotatable body adapted during rotation to support in wrapped relation the metal stock under treatment, a slide mounted for reciprocal movement toward and from the metal stock on said body, means for actuating said slide responsively to the rotation of said body, a pair of metal-cutting arms pivotally carried by the inner end of said slide, a pair of metal-forming rollers pivotally engaging said arms, a guide track for said forming rollers operable to direct the rollers during reciprocal movement of said slide and arms, the forming body being provided with a recess adjacent the path of said slide, and a cutting member in said recess adapted to be brought into engagement with the inner surface of the strip under treatment, the cutting member coacting with said arms in severing said strip, responsively to movement of said slide.

26. In combination in a rotary mechanism for cutting and forming metal strip, a rotor by which the strip is carried in wrapped relation, a rockable cutting and forming element carried by the rotor near the periphery thereof, means for periodically actuating the cutting and forming element during rotation of the rotor, and a clamp for the strip material adapted to be actuated to a clamping position responsively to cutting and forming movement of the said element.

27. In a device for processing strip metal, a metal receiving and supporting element, a pair of cutting and forming heads, means for periodically imparting at least a partial rotative movement to each of said heads whereby to bring them into engagement with the metal on the supporting element, said heads being formed to provide companion metal-receiving recesses, one margin of each recess extending in a direction diametrally of the head, and each head providing a metal cutting portion along another margin of its recess.

28. In an assembly of metal cutting and forming heads to be mounted in adjacence to a support for strip metal stock, two companion cutting and forming heads, each mounted for at least partial rotation, each head being undercut so as to form a recess accommodating the stock, each recess having one marginal wall of a trend along the diameter of the head and a cutting edge substantially parallel to the axis of the head, and means operatively connecting the heads for concurrent actuation, responsively to actuation of one of the heads.

29. In a rotary mechanism for cutting and forming strip metal, a rotor constituting a metal support, a structure adapted for reciprocal movement toward and from the rotor and metal stock thereon, said structure including a pivoted cutting and forming arm, an auxiliary arm connected thereto and a guide roller on the auxiliary arm; and a guide race disposed for engagement by the roller, the race being shaped to define, at least in part, the shaping of the metal stock under treatment.

30. In combination in a rotary mechanism for cutting and forming strip metal, a rotatable body serving as a carrier for the metal strip, a plurality of structures rotatable with the body and mounted for rocking movement adjacent the periphery of the body, cutting and forming elements carried by the rocking structures, and means for actuating the said structures and elements responsively to rotation of the body.

31. In combination in a rotary mechanism for cutting and forming strip metal, a rotatable body serving as a carrier and providing a forming surface for the metal strip, a plurality of structures rotatable with the body and mounted for at least a partial rotating movement adjacent the periphery of the rotatable body, cutting and forming elements carried by the rotating structures, and stationary camming means for actuating the said structures and elements responsively to rotation of the body.

32. In combination in a rotary mechanism for cutting and forming metal strip, a reel member on which the strip is carried, a plurality of cutting and forming elements journalled on the reel member and means for imparting at least a partial rotating movement to the cutting and forming elements.

33. A rotatably mounted metal-cutting and -forming head for use in connection with a die body, the head being characterized by a metal-receiving recess having walls shaped to define a portion of a metal object to be formed, and an apexed portion associated with one of the walls and adapted upon rotative movement of the head, to serve as a metal cutting element.

34. In combination, in an assembly of elements for cutting and forming metal strip, means for cutting the strip into predetermined lengths, a metal-forming head of generally cylindrical aspect, a support for the metal under treatment, means by which the head is mounted for movement about its axis, adjacent the support, the head being characterized by relatively recessed and projecting portions, a recessed portion serving to receive the metal under treatment, a roller element carried by the head and adapted to engage in forming relation the metal under treatment as the head is rotated, and means for actuating the head and the cutting means.

35. In combination, in an assembly of elements for cutting and forming metal strip, means for cutting the strip into predetermined lengths, a rotatably mounted metal-forming head of generally cylindrical aspect, a support for the metal under treatment, adjacent which the head is mounted, the head being characterized by relatively recessed and projecting portions, a recessed portion serving to receive the metal under treatment, and a roller element carried by the head and adapted to form the metal under treatment as the head is rotated, the roller element being supported for movement about an axis substantially parallel to that of the head by which it is carried, and means for actuating the forming head and the cutting means.

36. In combination, in an assembly of elements for cutting and forming metal strip, a cutting head overlying the strip for the division thereof into predetermined lengths, a metal forming head of generally cylindrical aspect, a rotatable support for the metal under treatment, adjacent which the heads are mounted each for movement about its axis, the forming head being characterized by relatively recessed and projecting portions, a recessed portion serving to receive the metal under treatment, a roller element carried by the head and adapted to engage the metal under treatment as the head is rotated, the roller element being supported for movement about an axis substantially parallel to that of the head by which it is carried, means for rotating the support, and means for concurrently actuating the cutting and forming heads responsively to rotation of the support.

37. In combination in a device for cutting and forming metal strip, an element of generally cylindrical shape, a support for the metal strip under treatment adjacent which the cylindrical element is journalled for at least partial rotation, the cylindrical element being characterized by relatively recessed and projecting portions adjacent the support, the recessed portion serving to receive the metal under treatment within the confines of the cylindrical element, and a relatively projecting portion serving to cut and form the metal stock responsively to actuation of the cylindrical element; and means for actuating the cylindrical element.

38. In a rotary mechanism for processing elongate metal stock, a rotary die body adapted to receive the stock in wrapped relation, a rock shaft carried by the body, a metal cutting and forming structure actuated by the rock shaft and disposed to engage the metal on said body, said structure and the body being provided with recessed portions adjacent each other and with relatively projecting portions adjacent the recesses, and means for reciprocally actuating the rock shaft as the body is rotated, whereby to cause one of the projecting portions to enter a recessed portion of the body for forming the metal stock thereon.

39. In a device for processing elongate metal stock, a metal supporting body, a member mounted adjacent said body for rockable movement about the axis of the member, metal cutting and forming elements carried by the rockable member and disposed to engage the metal on the body, means for moving the body and means for actuating the rockable member responsive to movement of the body.

RAYMOND E. BEEGLE.